(12) United States Patent
Breidenbach

(10) Patent No.: US 7,374,230 B2
(45) Date of Patent: May 20, 2008

(54) AERODYNAMIC DRAG REDUCING APPARATUS

(76) Inventor: Thomas Scott Breidenbach, 10692 N. Eagle Lake Blvd., Maple Grove, MN (US) 55369

( * ) Notice: Subject to any disclaimer, the term of this patent is extended or adjusted under 35 U.S.C. 154(b) by 0 days.

(21) Appl. No.: 11/565,254

(22) Filed: Nov. 30, 2006

(65) Prior Publication Data
US 2007/0126261 A1    Jun. 7, 2007

Related U.S. Application Data

(60) Provisional application No. 60/741,155, filed on Dec. 1, 2005.

(51) Int. Cl.
*B60R 27/00* (2006.01)
(52) U.S. Cl. .................. 296/180.4; 296/180.1
(58) Field of Classification Search ............. 296/180.1, 296/180.2, 180.4
See application file for complete search history.

(56) References Cited

U.S. PATENT DOCUMENTS

| | | | |
|---|---|---|---|
| 609,789 A | 8/1898 | Capewell |
| 2,737,411 A | 3/1956 | Potter |
| 2,772,624 A | 12/1956 | Carnes |
| 2,780,980 A | 2/1957 | Kennedy |
| 2,887,243 A | 5/1959 | Murdock, Sr. |
| 3,016,700 A | 1/1962 | Howald |
| 3,342,523 A | 9/1967 | Lutgen |
| 3,346,186 A | 10/1967 | Fulton et al. |
| 3,526,365 A | 9/1970 | Darrow, Jr. |
| 3,977,716 A | 8/1976 | Whited |
| 4,006,932 A | 2/1977 | McDonald |
| 4,117,900 A | 10/1978 | Amick |
| 4,142,755 A | 3/1979 | Keedy |
| 4,154,149 A | 5/1979 | Holford |
| 4,236,745 A | 12/1980 | Davis |
| 4,257,641 A | 3/1981 | Keedy |
| 4,349,155 A | 9/1982 | Donguy |
| 4,383,407 A | 5/1983 | Inman |
| 4,451,074 A | 5/1984 | Scanlon |
| 4,458,936 A | 7/1984 | Mulholland |
| 4,489,889 A | 12/1984 | Inman |
| 4,508,380 A | 4/1985 | Sankrithi |
| 4,601,508 A | 7/1986 | Kerian |
| 4,682,808 A | 7/1987 | Bilanin |
| 4,688,841 A | 8/1987 | Moore |
| 4,702,509 A | 10/1987 | Elliott, Sr. |
| 4,741,569 A | 5/1988 | Sutphen |
| 4,784,429 A | 11/1988 | Hodges |
| 4,818,015 A | 4/1989 | Scanlon |
| 4,944,550 A | 7/1990 | Drown et al. |
| 4,978,162 A | 12/1990 | Labbe |
| 5,058,945 A | 10/1991 | Elliott, Sr. et al. |

(Continued)

OTHER PUBLICATIONS

"Notification of Transmittal of the International Search Report and the Written Opinion of the International Searching Authority, or the Declaration" relating to PCT Application No. PCT/US06/24642 (Jul. 27, 2007).

*Primary Examiner*—Lori L. Lyjak
(74) *Attorney, Agent, or Firm*—Merchant & Gould P.C.

(57) ABSTRACT

An aerodynamic drag reducing apparatus for use with vehicles having downstream surfaces that are not streamlined. The apparatus consists of folding panels that extend rearward for use in a drag reducing configuration and collapse for use in a space saving configuration.

21 Claims, 21 Drawing Sheets

U.S. PATENT DOCUMENTS

| | | |
|---|---|---|
| 5,156,195 A | 10/1992 | Wehler et al. |
| 5,190,342 A | 3/1993 | Marlowe et al. |
| 5,236,347 A | 8/1993 | Andrus |
| 5,332,280 A | 7/1994 | DuPont |
| 5,348,366 A | 9/1994 | Baker et al. |
| 5,375,903 A | 12/1994 | Lechner |
| 5,498,059 A | 3/1996 | Switlik |
| 5,609,384 A | 3/1997 | Loewen |
| 5,823,610 A | 10/1998 | Ryan et al. |
| 5,947,548 A | 9/1999 | Carper et al. |
| 6,092,861 A | 7/2000 | Whelan |
| 6,205,772 B1 | 3/2001 | Perrier et al. |
| 6,257,654 B1 | 7/2001 | Boivin et al. |
| 6,286,892 B1 | 9/2001 | Bauer et al. |
| 6,286,894 B1 | 9/2001 | Kingham |
| 6,309,010 B1 | 10/2001 | Whitten |
| 6,409,252 B1 | 6/2002 | Andrus |
| 6,418,710 B1 | 7/2002 | Perrier et al. |
| 6,457,766 B1 | 10/2002 | Telnack |
| 6,467,833 B1 | 10/2002 | Travers |
| 6,485,087 B1 | 11/2002 | Roberge et al. |
| 6,666,498 B1 | 12/2003 | Whitten |
| 6,669,270 B1 | 12/2003 | Card et al. |
| 6,789,839 B1 | 9/2004 | Samuelson |
| 6,799,791 B2 | 10/2004 | Reiman et al. |
| 6,854,788 B1 | 2/2005 | Graham |
| 2002/0005655 A1 | 1/2002 | Bauer et al. |
| 2002/0021023 A1 | 2/2002 | Leban |
| 2002/0030384 A1 | 3/2002 | Basford |
| 2003/0205913 A1 | 11/2003 | Leonard |

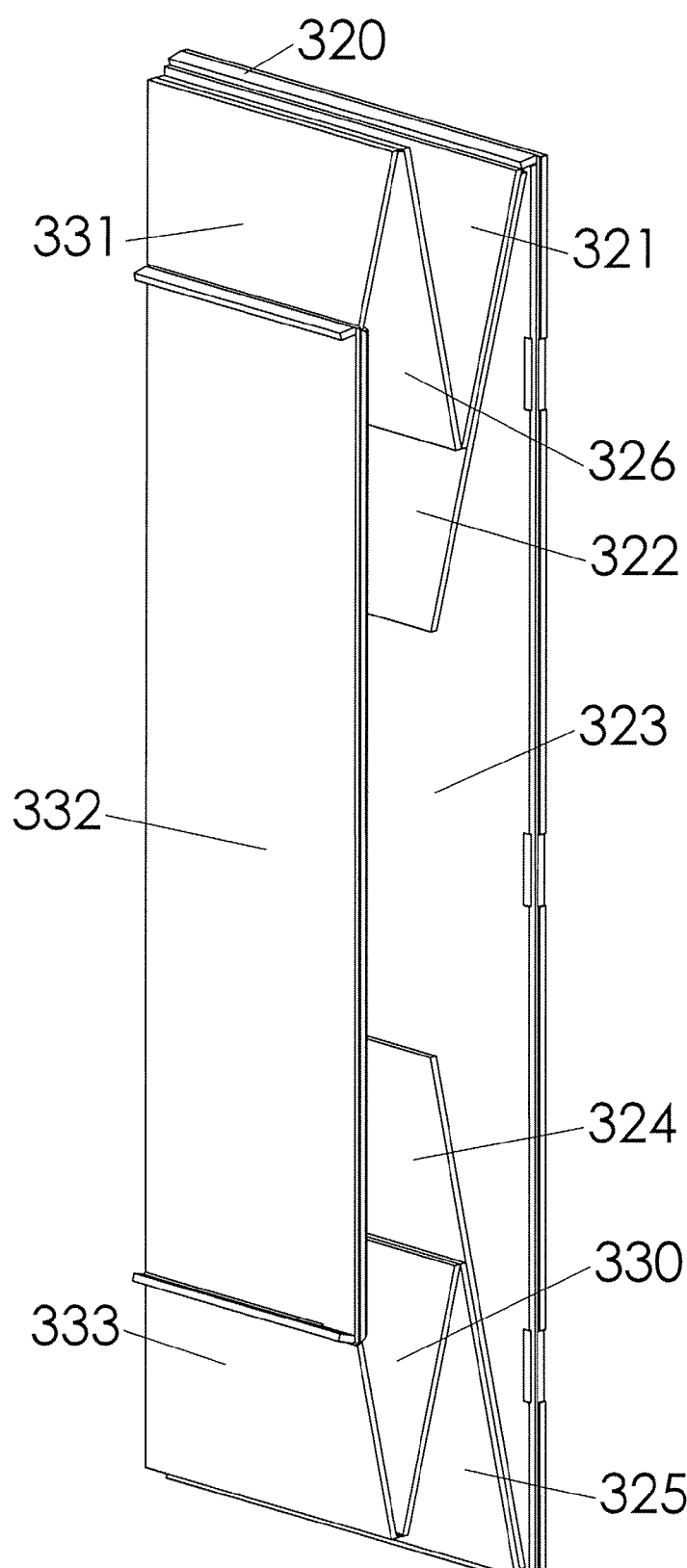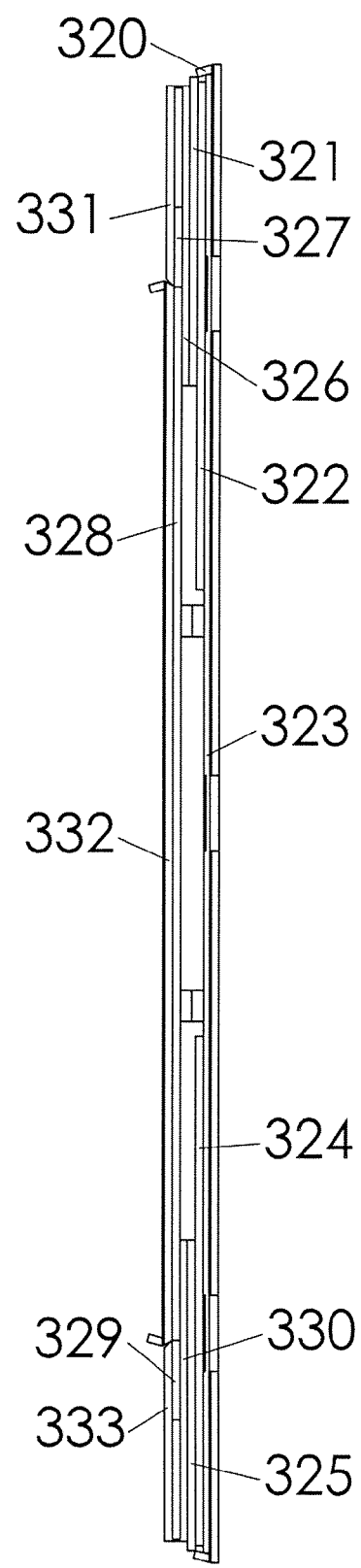
Fig. 8A
Fig. 8B

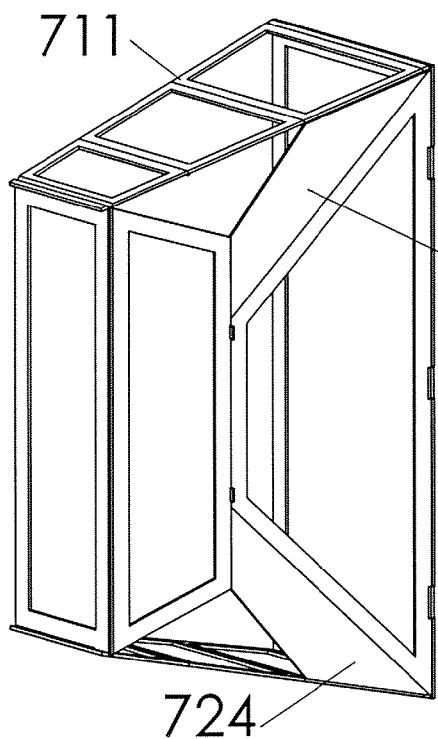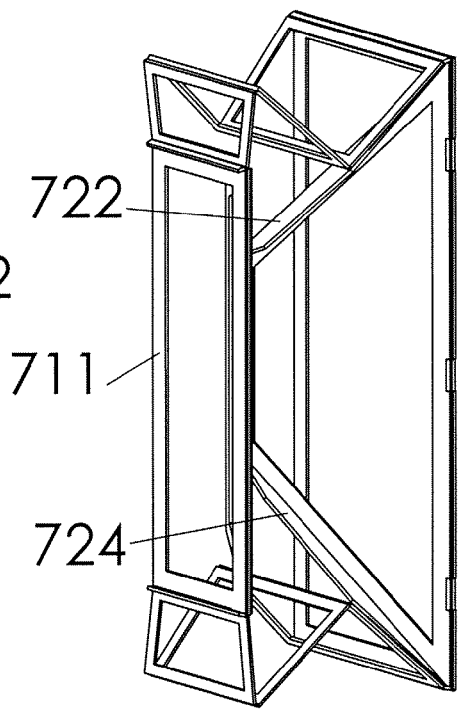
Fig. 14A  Fig. 14B
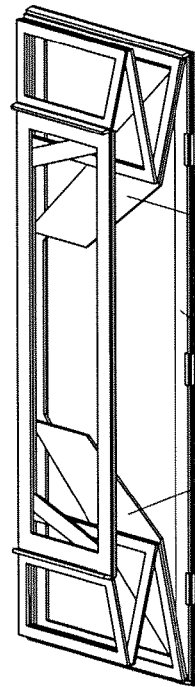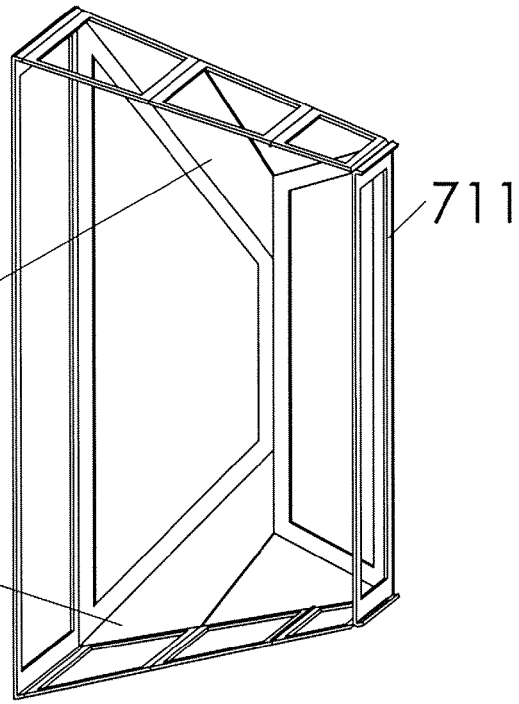
Fig. 14C  Fig. 14D

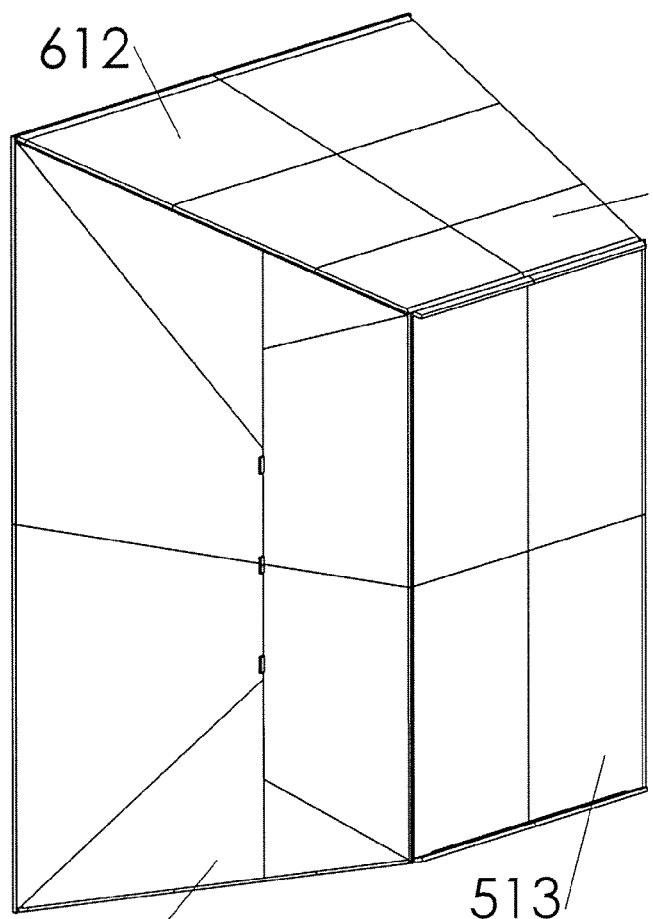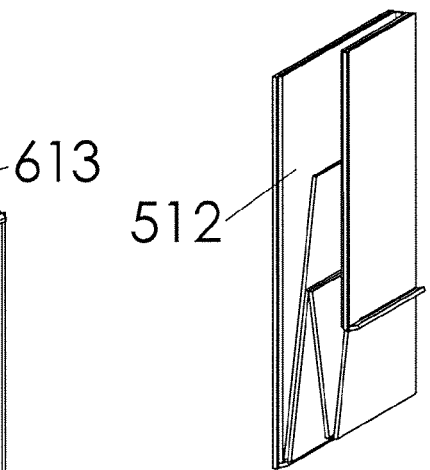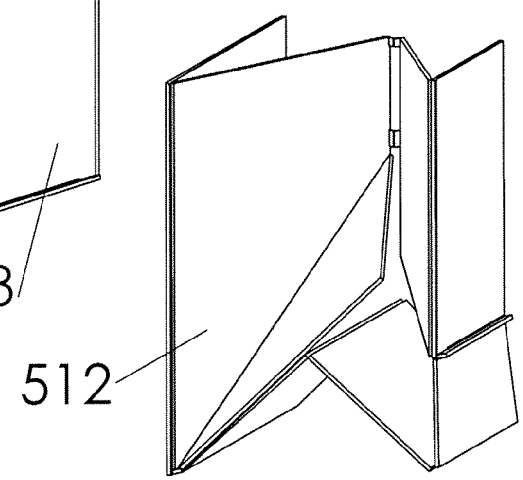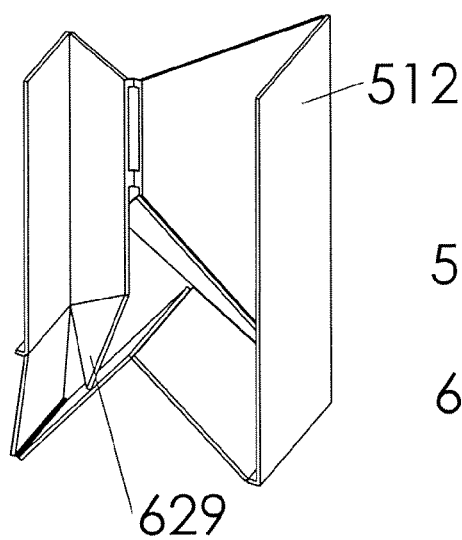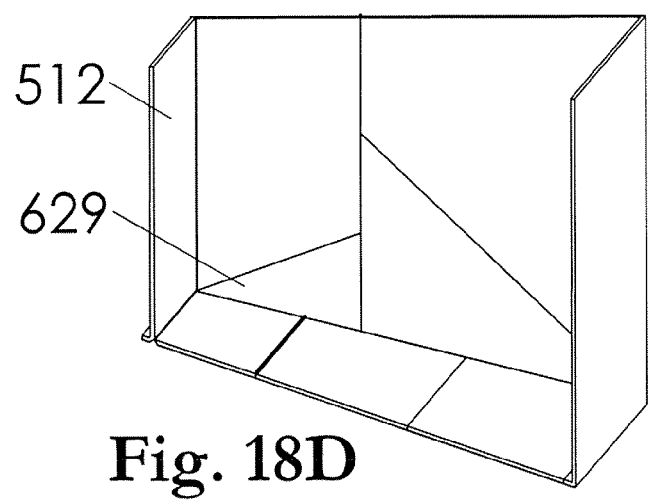
Fig. 17
Fig. 18A
Fig. 18B
Fig. 18C
Fig. 18D

AERODYNAMIC DRAG REDUCING APPARATUS

CROSS REFERENCE TO RELATED APPLICATION

This application claims the benefit of U.S. Provisional Patent Application Ser. No. 60/741,155, filed Dec. 1, 2005, which application is hereby incorporated by reference in its entirety.

TECHNICAL FIELD

The present invention relates to an aerodynamic drag reducing apparatus for use with vehicles having downstream surfaces that are not streamlined. Examples include: over-the-road trucks and truck trailers, vans and minivans, motor homes and travel trailers, and pickup trucks. In vehicles such as pickup trucks, one non-streamlined surface is near the center of the vehicle. The present invention is suitable for use with vehicles having rear doors.

BACKGROUND

It is known that a significant amount of aerodynamic drag is created when a vehicle travels at velocities typical on a modern roadway. This is due, in large part, to areas of low pressure that are induced on the rear surfaces of the vehicle. The low pressure becomes more pronounced as airflow over the vehicle separates from the vehicle surfaces. The phenomenon of airflow separation is also well known in the design of aircraft wings and, in this case, causes the wing to stall.

Vehicles having blunt rear ends are especially affected by airflow separation starting at the abrupt transition to the rear—near vertical surface. The low pressure that the airflow separation induces is compounded by the relatively large area on which the low air pressure acts in comparison with more streamlined vehicles.

The low air pressure acting on the rear surfaces of a moving vehicle produces a force that resists the forward motion of the vehicle. This force is opposed by the vehicle's engine and requires power that is typically produced by burning fuel. Any reduction in aerodynamic drag results in a reduction in fuel consumption.

In the current period of high fuel prices and increasing environmental consciousness, fuel efficiency improvements are a growing concern. Aerodynamic improvements are especially valuable since they can be combined with other improvements such as engine efficiency and reduced chassis weight. Increasing fuel efficiency also provides the valuable benefit of increasing the range a given vehicle can travel between refueling.

The present invention employs the technique of adding tapered rear surfaces to a vehicle. The same streamlining principle is practiced with other vehicles such as high-speed cars and airplanes. It has also been applied to over-the-road trucks where it is known as a "boat-tail".

SUMMARY

The present invention is concerned with providing an aerodynamic drag reducing apparatus for vehicles with the purpose of reducing energy consumption. More specifically, this is achieved by adding gently sloping surfaces downstream of rear facing surfaces of the vehicle with the goal of reducing airflow separation and aerodynamic drag. This, in turn, reduces fuel consumption.

On certain vehicles, simply adding the required additional surfaces would result in a substantial increase to the vehicle length. This length would be acceptable, in many cases, on the open road in uncongested traffic, but would be impractical on crowded urban roadways, in parking lots, in campgrounds, and by loading docks. To address this, the present invention has two primary configurations. The first is an extended configuration that reduces drag and fuel consumption, especially at highway speeds. The second is a retracted configuration that provides much less, if any, drag reduction, but results in a more compact vehicle that is practical in crowded areas. This combination of configurations in the same apparatus is especially useful since zones of higher speed traffic are often not congested. These high-speed zones are also where the drag reducing potential is the highest. Likewise, congested areas often have reduced traffic speed with less drag reducing potential, but in these cases, the retracted configuration may be required for maneuvering.

In order to easily and conveniently convert between the retracted configuration and the extended configuration, the present invention employs panels that fold as part of an apparatus attached to the rear of the vehicle.

To accommodate vehicles where access to the rear end is required, certain embodiments of the present invention allow the apparatus to be temporarily moved without removal from the vehicle. In certain embodiments, a single whole apparatus is mounted on a support panel, door, or framework that in turn is mounted on a hinge, linkage, or linear slide. Other embodiments of the present invention have the overall aerodynamic shape split into two halves. These halves can be mounted on hinges and opened, providing access to the rear of the vehicle. Optionally, the halves can be integrated with the rear doors of the vehicle.

BRIEF DESCRIPTION OF THE DRAWINGS

The benefits and advantages of the present invention will become more readily apparent to those of ordinary skill in the relevant art after reviewing the following detailed description and accompanying drawings, wherein:

FIGS. 1A through 1F are all views sharing the same perspective from the left rear corner. In particular:

FIG. 1A shows a fully extended configuration with the trailer doors closed.

FIG. 1B shows a fully retracted configuration with the trailer doors closed.

FIGS. 1C through 1F are enlarged partial views of the same scale. In particular:

FIG. 1C shows a fully retracted configuration with the trailer doors closed.

FIG. 1D shows the right apparatus fully extended with its trailer door closed and the left apparatus fully retracted with its trailer door open.

FIG. 1E shows a fully retracted configuration with the trailer doors opened.

FIG. 1F shows a partially retracted configuration with the trailer doors closed.

FIGS. 1G through 1I are all enlarged partial left elevation views of the same scale shown with the trailer doors closed. In particular:

FIG. 1G shows a fully extended configuration.

FIG. 1H shows a partially retracted configuration.

FIG. 1I shows a fully retracted configuration.

FIGS. 1J through 1M are all enlarged partial top plan views of the same scale. In particular:

FIG. 1J shows a fully extended configuration with the trailer doors closed.

FIG. 1K shows a partially retracted configuration with the trailer doors closed. The right apparatus has its non-vertical panels removed for the purpose of illustration.

FIG. 1L shows a fully retracted configuration with the trailer doors closed.

FIG. 1M shows a fully retracted configuration with the trailer doors opened.

FIGS. 2A and 2B share the same scale and view perspective from the right rear corner. In particular:

FIG. 2A shows both panel groups in a fully retracted configuration.

FIG. 2B shows both panel groups in a fully extended configuration.

FIGS. 2C and 2D share the same scale and partly show the interior of the apparatus with both panel groups in a partially retracted configuration. In particular:

FIG. 2C is a view from the left rear corner.

FIG. 2D is a view from the left front corner.

FIGS. 3A and 3B share the same view perspective from the right rear corner. In particular:

FIG. 3A shows the larger panel group of FIGS. 2A through 2D.

FIG. 3B shows the smaller panel group of FIGS. 2A through 2D.

FIGS. 3C and 3D share the same scale and view perspective from the left rear corner and partly show the interior of the panel group. In particular:

FIG. 3C shows the smaller panel group of FIGS. 2A through 2D.

FIG. 3D shows the larger panel group of FIGS. 2A through 2D.

FIGS. 4A through 4C share the same view perspective from the left rear corner. In particular:

FIG. 4A shows the panels in a fully extended configuration.

FIG. 4B shows the panels in a partially retracted configuration.

FIG. 4C shows the panels in a fully retracted configuration.

FIGS. 4D through 4F share the same view perspective from the right rear corner. In particular:

FIG. 4D shows the panels in a fully extended configuration.

FIG. 4E shows the panels in a partially retracted configuration.

FIG. 4F shows the panels in a fully retracted configuration.

FIGS. 5A through 5C have the same view perspective as FIGS. 4D through 4F. In particular:

FIG. 5A shows the panels in a fully extended configuration.

FIG. 5B shows the panels in a partially retracted configuration.

FIG. 5C shows the panels in a fully retracted configuration.

FIG. 5D has the same view perspective as FIGS. 4A through 4C and shows the panels in a fully extended configuration.

FIGS. 6A and 6B show the panels in a fully extended configuration. In particular:

FIG. 6A has the same view perspective as FIGS. 4A through 4C.

FIG. 6B has the same view perspective as FIGS. 4D through 4F.

FIGS. 6C and 6D show the panels in a partially retracted configuration. In particular:

FIG. 6C has the same view perspective as FIGS. 4A through 4C.

FIG. 6D has the same view perspective as FIGS. 4D through 4F.

FIGS. 8A and 8B are enlarged views of the same scale, showing the panel group of FIGS. 3A and 3D in a fully retracted configuration. In particular:

FIG. 8A has the same view perspective as FIGS. 4D through 4F.

FIG. 8B is a right elevation view.

FIG. 9A is the front panel.

FIG. 9N is the rearmost bottom panel.

FIG. 10A shows the panel group in a fully extended configuration.

FIG. 10B shows the panel group in a partially retracted configuration.

FIG. 10C shows the panel group in a fully retracted configuration.

FIG. 12A shows the panel group in a fully extended configuration.

FIG. 12B shows the panel group in a partially retracted configuration.

FIG. 12C shows the panel group in a fully retracted configuration.

FIG. 13A shows the panel group in a fully extended configuration.

FIG. 13B shows the panel group in a partially retracted configuration.

FIG. 13C shows the panel group in a fully retracted configuration.

FIGS. 14A through 14D are all perspective views sharing the same scale, showing a framed panel group from a forth embodiment of the present invention. The covering of the framed panel group is not shown for the purpose of illustration. In particular:

FIGS. 14A through 14C have the same scale and view perspective as their counterparts in FIGS. 5A through 5C. In particular:

FIG. 14A shows the framed panel group in a fully extended configuration.

FIG. 14B shows the framed panel group in a partially retracted configuration.

FIG. 14C shows the framed panel group in a fully retracted configuration.

FIG. 14D has the same scale and perspective as its counterpart in FIG. 5D and shows the framed panel group in a fully extended configuration.

FIG. 15A is a view from the upper right corner primarily showing the exterior of the framed panels.

FIG. 15B is a view from the lower right corner primarily showing the interior of the framed panels.

FIG. 16A is a perspective view illustrating a fully closed joint with the fabric wrapping around the joined panels.

FIG. 16B through 16E illustrates a joint with the fabric folding between the joined panels with a joint-stop and bias spring as optional features. In particular:

FIG. 16B is a perspective view illustrating a partially opened joint.

FIGS. 16C through 16E are views perpendicular to the folding axis. In particular:

FIG. 16C illustrates a fully opened joint held by the joint-stop and compressing the bias spring.

FIG. 16D illustrates a partially opened joint contacting the bias spring.

FIG. 16E illustrates a fully closed joint.

FIG. 17 is a perspective view from the left rear corner, showing a set of four panel groups from a fifth embodiment of the present invention in a fully extended configuration. In this embodiment, the aerodynamic drag reducing apparatus is split into four quarters.

FIGS. 18A through 18D are all perspective views sharing the same scale of FIG. 17 and showing the lower left panel group of FIG. 17. In particular:

FIGS. 18A and 18B share the same view perspective from the left rear corner and primarily show the exterior of the panel groups. In particular:

FIG. 18A shows the panel group in a fully retracted configuration.

FIG. 18B shows the panel group in a partially retracted configuration.

FIGS. 18C and 18D share the same view perspective from the right front corner and primarily show the interior of the panel groups. In particular:

FIG. 18C shows the panel group in the same configuration as FIG. 18B.

FIG. 18D shows the panel group in a fully extended configuration.

DETAILED DESCRIPTION

Figure 1A:
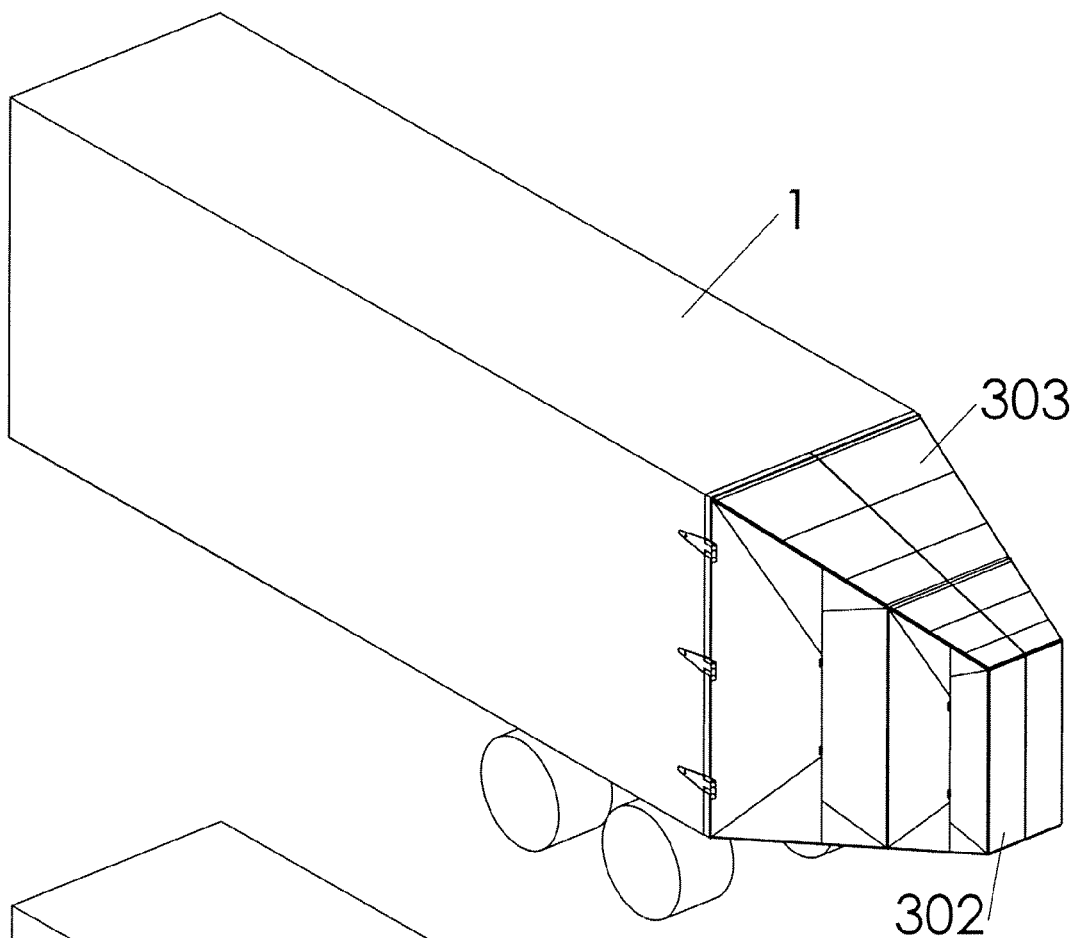
FIGS. 1A through 1M show a first embodiment of the present invention mounted on the rear of an over-the-road trailer in various configurations. In this embodiment, the aerodynamic drag reducing apparatus is in two halves, split right and left. The right and left halves can be opened for access to the rear of the trailer. In particular.

While the present invention is susceptible of embodiment in various forms, there are shown in the drawings and will hereinafter be described presently preferred embodiments with the understanding that the present disclosure is to be considered an exemplification of the invention and is not intended to limit the invention to the specific embodiments illustrated.

The embodiments presented are also shown in various forms and shapes and with various optional features in various combinations. These variations also are exemplifications of the invention and are not intended to limit the combinations of fonts, shapes, and optional features.

As described above, the present invention is suited for use behind vehicles with vertical or near vertical rear facing surfaces and serves to streamline the vehicle when in the extended configuration. When necessary, the present invention can transform into a retracted configuration to save space. The ability to form two configurations and transform from one to the other without disassembly is made possible by the strategic use of folding panels in an apparatus as described below.

In the present invention, the folding panels are arranged into panel groups. Multiple panel groups may be attached to each other in series from front to back within the same apparatus. The panel groups may be individually extended or retracted. When all panel groups are fully extended, the apparatus itself is fully extended and is in the first of its primary configurations. Likewise, when all the panel groups are fully retracted, the apparatus itself is fully retracted and is in the second of its primary configurations. When at least one panel group is extended and at least one panel group is retracted, the apparatus is in a secondary configuration. The apparatus may be comprised of a single panel group. In this case, the concept of a "secondary configuration" does not apply. Likewise, the definition of "primary configuration" extends to a panel group but "secondary configuration" does not.

The panels and the folding joints between them support loads imposed on the apparatus by gravity, airflow, uneven roads, and other operational causes. The panels may depend on a framework or multiple frameworks for structural support, or they may serve as their own structural support. The folding joint and structural connection between the panels may take the form of a simple or complex hinge; a linkage; a fibrous material, such as fabric or cord; or a solid deformable material, such as plastic. The same apparatus may use both framed and non-framed panels as well as a mixture of joint types.

In all of the embodiments of the present invention, folding panels are employed to allow the apparatus to transform between an extended and retracted configuration. The joints may take various forms as discussed above in any of the embodiments. Furthermore, a given apparatus may employ any of the joint forms in any combination. To simplify the discussion in this disclosure, the term "fold-line" is used to represent the folding action of any of the various joint types.

In certain embodiments of the present invention, the joints between certain panel pairs may both rotate along a hinge-line and linearly slide along the same hinge-line. This hinge-line may also be considered a "fold-line". In other embodiments, particularly those that use a fibrous or solid deformable material as a structural connection between the panels, multiple rotational and linear movements may occur between the panels, approximated by a fold-line and dominated by the folding rotation.

Figure 15A:
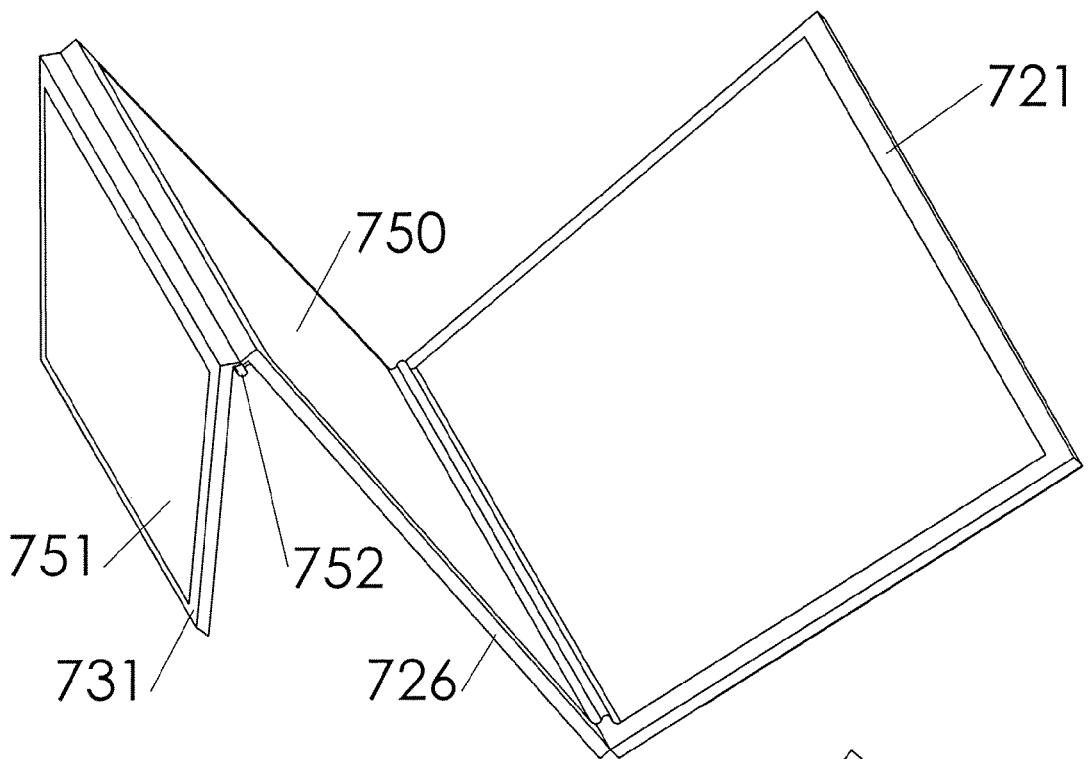
FIGS. 15A and 15B are enlarged perspective views showing the three top framed panels and their covering from the framed panel group of FIGS. 14A through 14D in a partially retracted configuration. In particular.
Figure 15B:
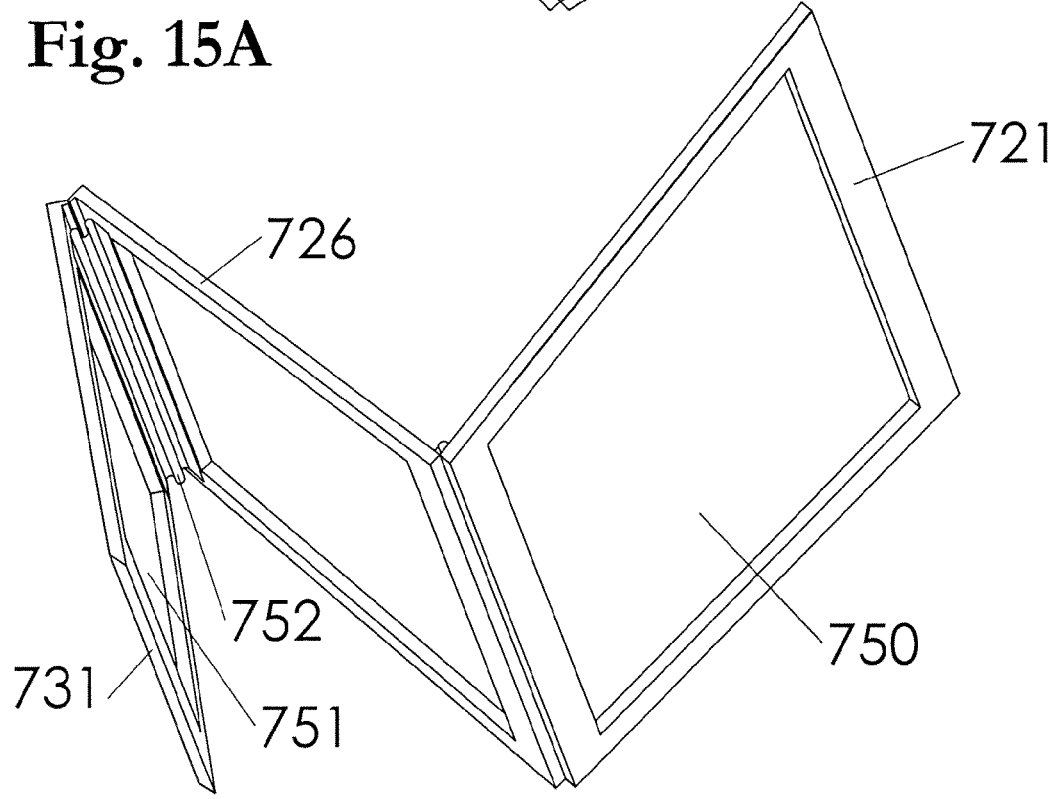
Figure 16A:
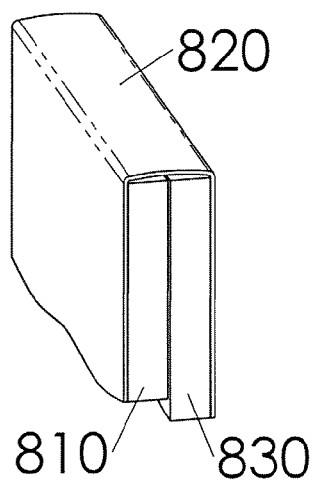
FIGS. 16A through 16E are enlarged partial views illustrating typical folding fabric panel joints. In particular.
Figure 16B:
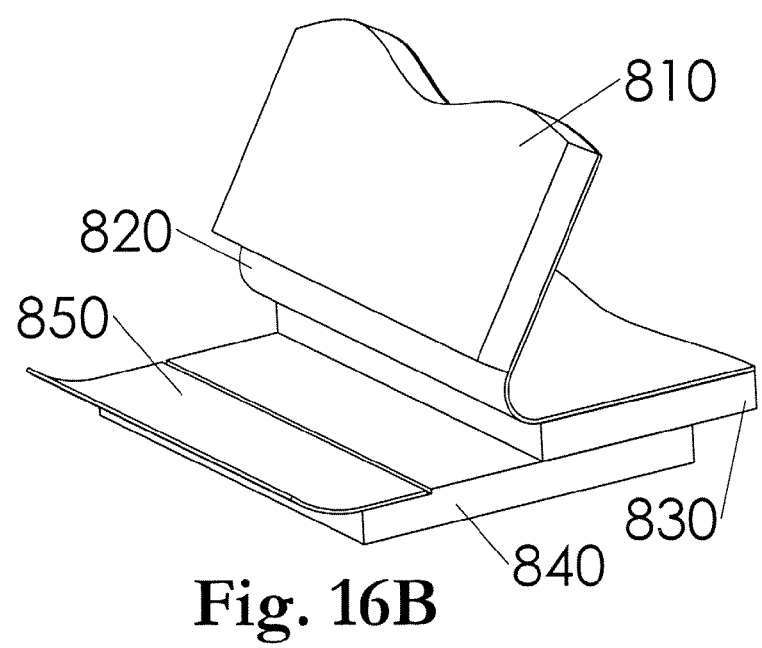
Figure 16C:
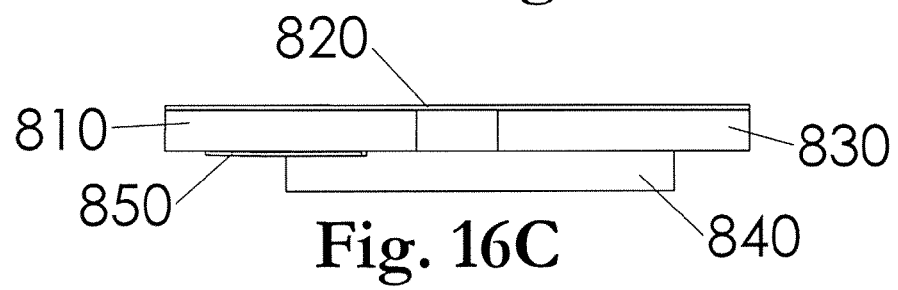
Figure 16D:
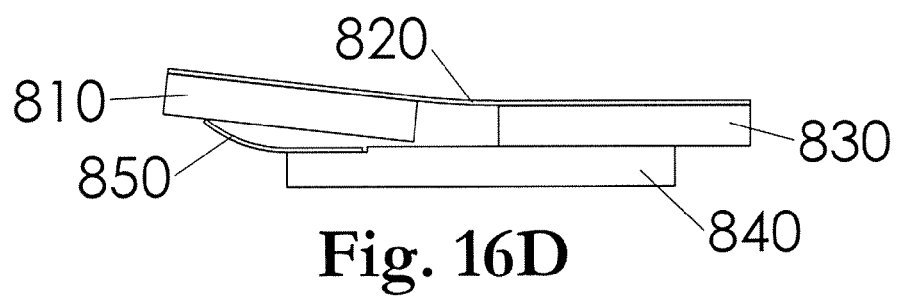
Figure 16E:
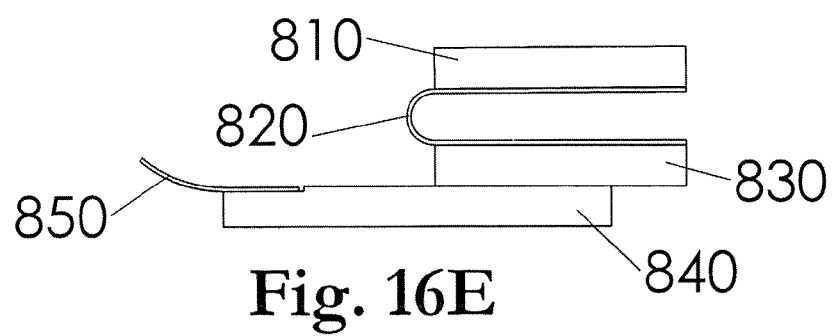

In certain embodiments of the present invention, flexible material, such as fabric, may be used to cover framework, forming a framed panel as illustrated in FIGS. 15A and 15B. The flexible material may extend from panel to panel and serve to keep dirt and debris from entering the interior of the apparatus. This is also illustrated in FIGS. 15A and 15B. In certain embodiments, the entire apparatus may be covered by a single continuous piece of flexible material. Optionally, the flexible material may also serve as a structural connection between certain panel pairs as mentioned in the preceding paragraphs as illustrated in FIGS. 16A through 16E. Flexible material may be located inside and/or outside the framework and may fully or partially form the interior and/or exterior of the apparatus. The flexible material may serve to seal the joints, making the apparatus substantially airtight.

An airtight apparatus may be filled with air as a method of extending the apparatus. Likewise, the air may be evacuated to retract the apparatus.

In certain embodiments of the present invention, the joints between panels may be spring-loaded, as illustrated in FIGS. 16B through 16E. The springs may assist in the extension and/or retraction of the panels. Bi-stable springs may also be used that serve both purposes. The joints may also have detents that aid in maintaining the apparatus in a primary configuration.

In certain embodiments of the present invention, removable parts may be attached to the panels or panel framework to keep them in a primary configuration. These parts may be fastened to the panels or panel framework by threaded fasteners, latches, hooks, or other means. In certain embodiments, the same removable parts may be used to keep both the extended and retracted configurations by attaching them in a different sequence and joining the features of the panels and the removable parts in different combinations.

Other optional features that may be used separately or together include joint-stops that keep the panels from reaching an undesired configuration, as illustrated in FIGS. 16B through 16E; latches that keep the apparatus in the primary configurations; and retraction and extension devices.

In certain embodiments of the present invention, pulleys and cables and/or other optional components may be used in a retraction and extension device either separately or together. These include pneumatic and hydraulic cylinders, linear drives, electric motors, gear sets, cord, chain, webbing, cams, and springs.

In certain embodiments of the present invention, certain panels or panel frameworks may deform from one configuration to the next or while transitioning between configurations. In certain cases, this is necessary to avoid kinematic lockup. This deformation will cause forces and moments to develop within and between the panels. These forces and moments may be employed to keep the panel groups stable in one or both primary configurations.

Referring now to the figures, in particular to FIGS. 1A through 1M, there is shown a first embodiment of the present invention mounted on the rear of an exemplary over-the-road trailer 1. More specifically, a left hand apparatus 302 and a right hand apparatus 303 are mounted and shown in various configurations. FIGS. 2A through 2D show the right hand apparatus 303 in detail and in various configurations. In the present embodiment, the right rear trailer door serves as a mounting platform for the right hand apparatus 303 and may also be integrated to become part of the apparatus 303. The exterior shape of the left hand apparatus 302 is a mirror image of the right hand apparatus 303. The same relationships between the left hand door and the left hand apparatus 302 exist as mentioned above for the right. To gain access to the cargo holding area 1A of the trailer 1, the apparatuses 302 and 303 are opened as typical trailer doors or with the trailer doors.

If the apparatuses 302 and 303 are symmetric in a vertical direction, as they are shown in FIGS. 1A through 1M, they can be identical with each other. In this case, the apparatuses 302 and 303 are simply assembled to their respective trailer doors upside down and rotated one-half turn from each other.

Figure 1B:
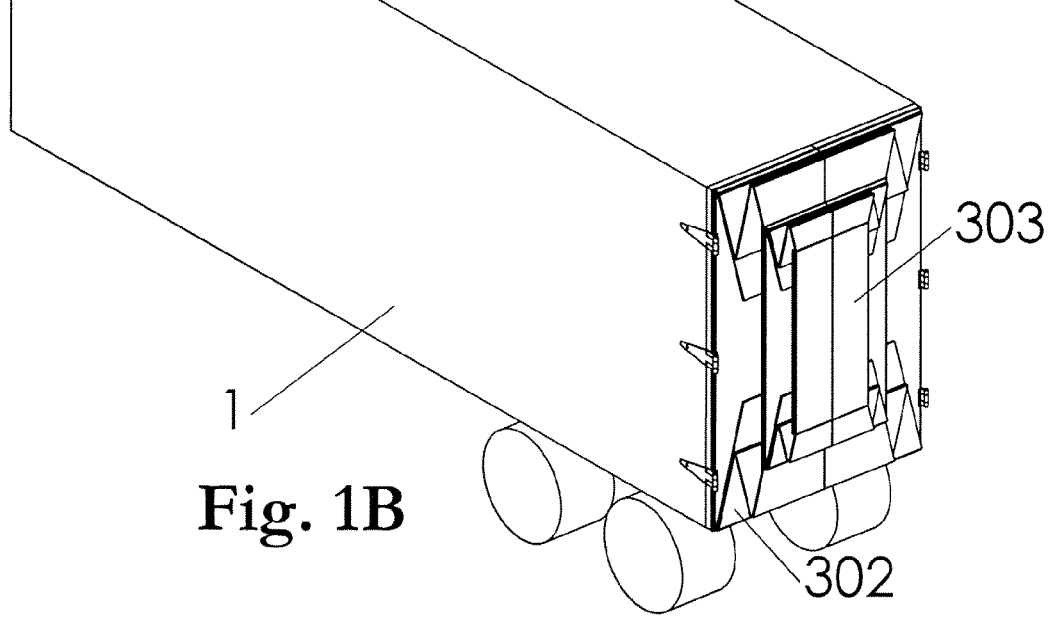
Figure 1C:
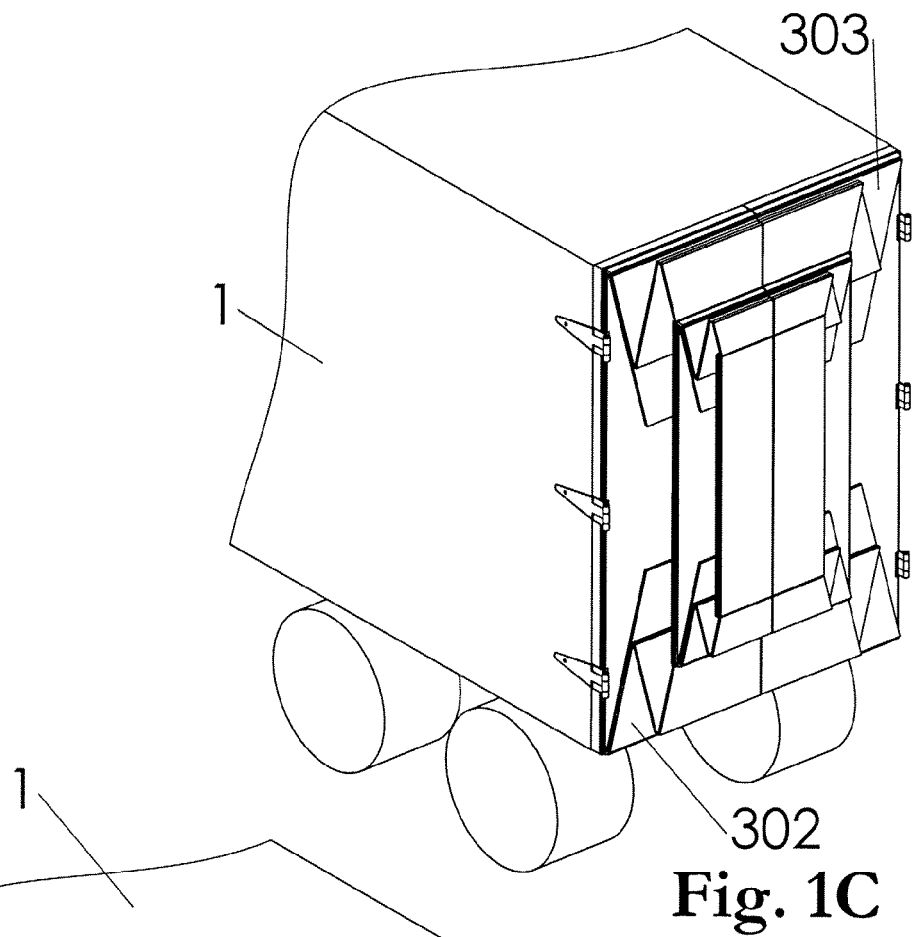
Figure 1D:
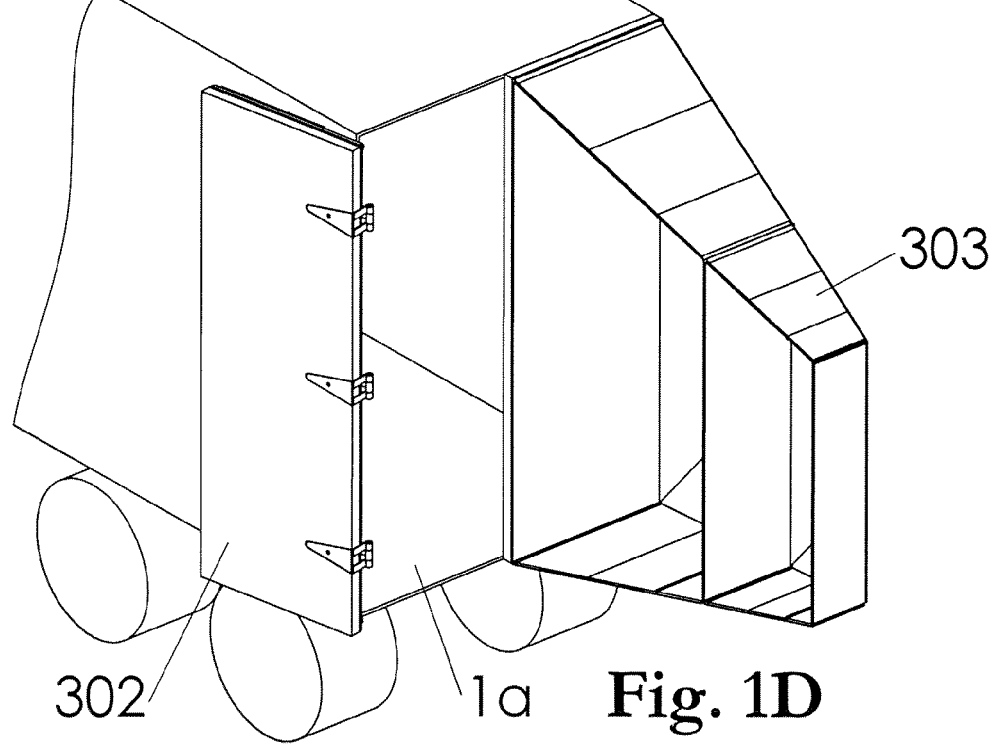
Figure 1E:
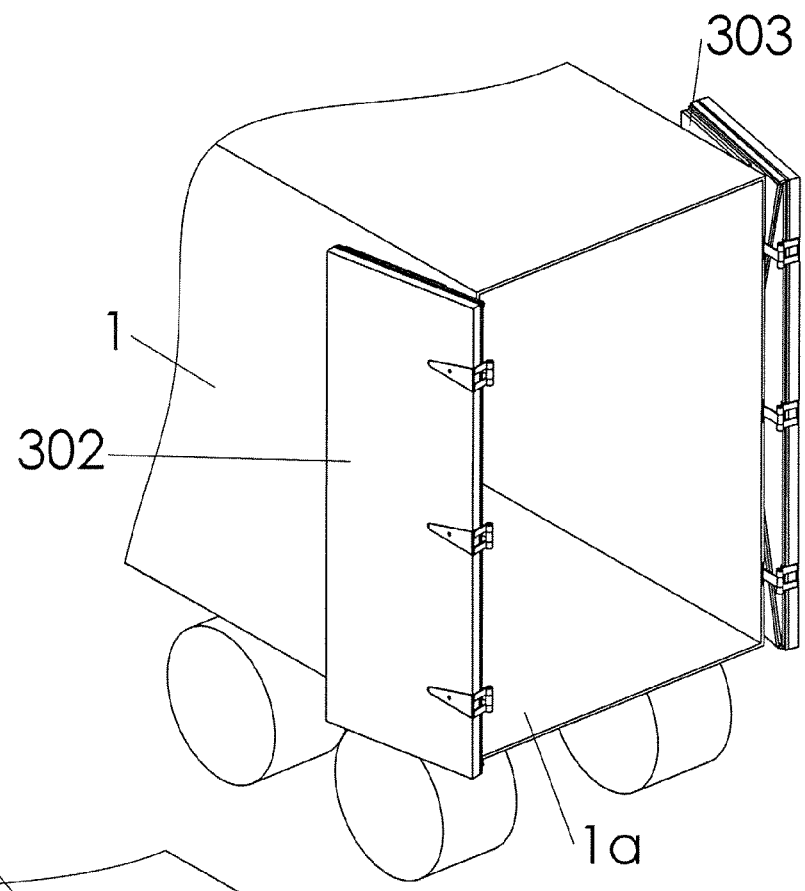

As mentioned above, the apparatuses 302 and 303 are normally used in one of two primary configurations, fully extended and fully retracted. FIG. 1A illustrates the fully extended configuration and FIG. 1B illustrates the fully retracted.

Figure 9A:
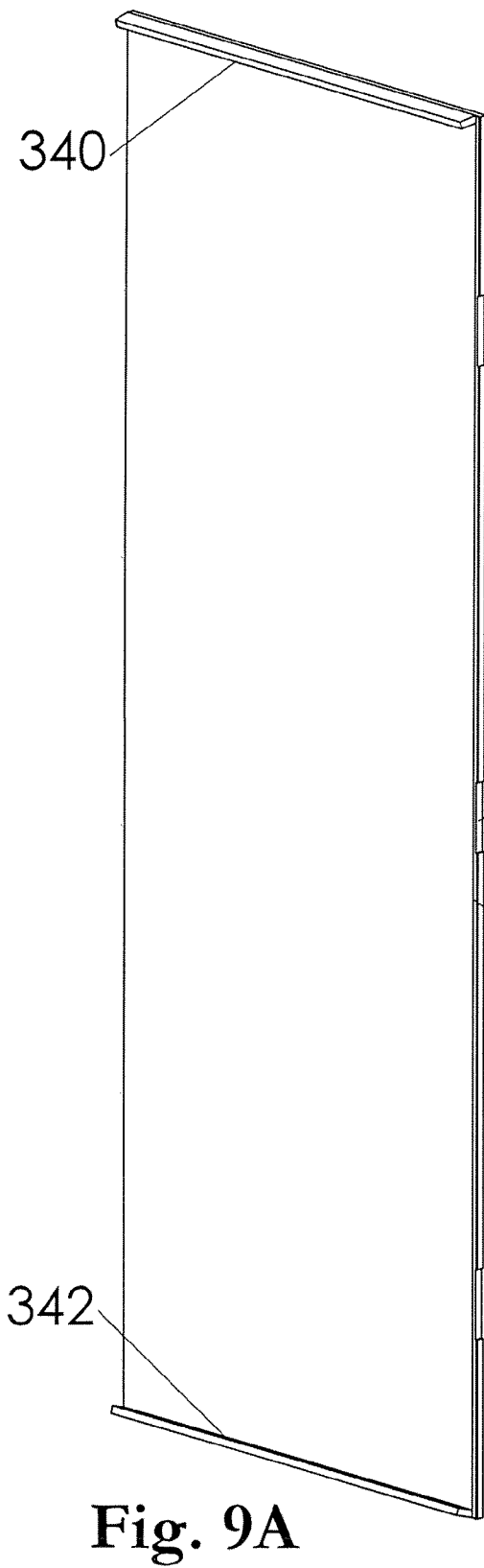
FIGS. 9A through 9N are all views with the same perspective and scale as FIG. 8A, showing the individual panels of the panel group of FIGS. 3A, 3D, 8A, and 8B. The configuration specific orientation of each panel is from the panel group in a fully retracted configuration (as shown in FIG. 8A). In particular.
Figure 9B:
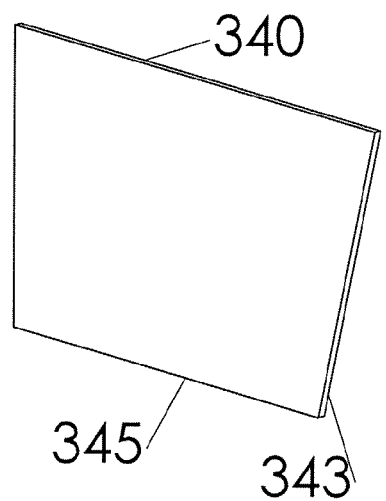
FIG. 9B is the forward-most top panel.
Figure 9C:
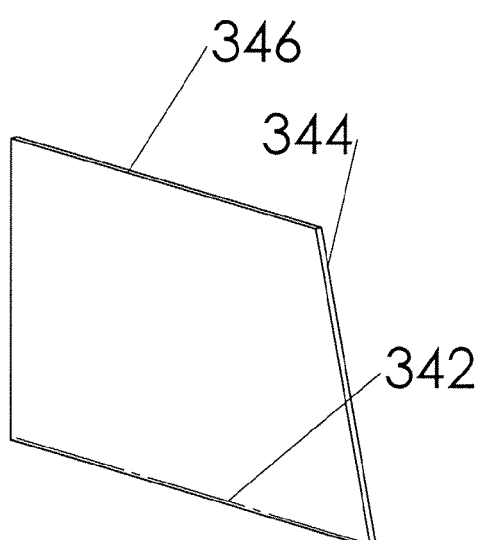
FIG. 9C is the forward-most bottom panel.
Figure 9D:
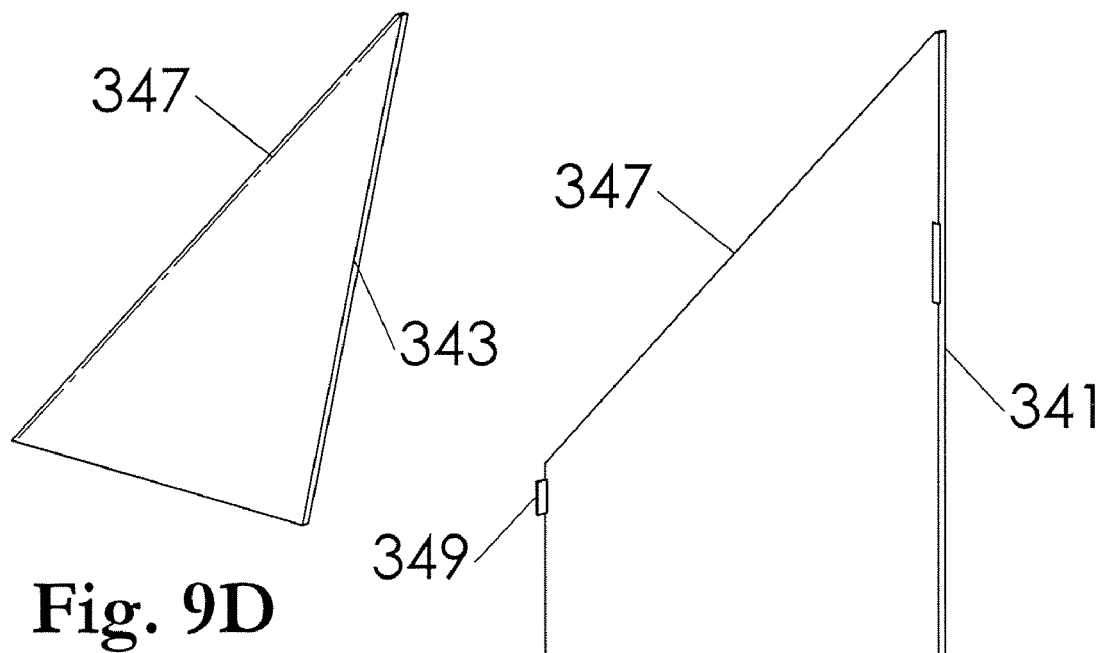
FIG. 9D is the forward-most upper triangular panel.
Figures 9E, 9F:
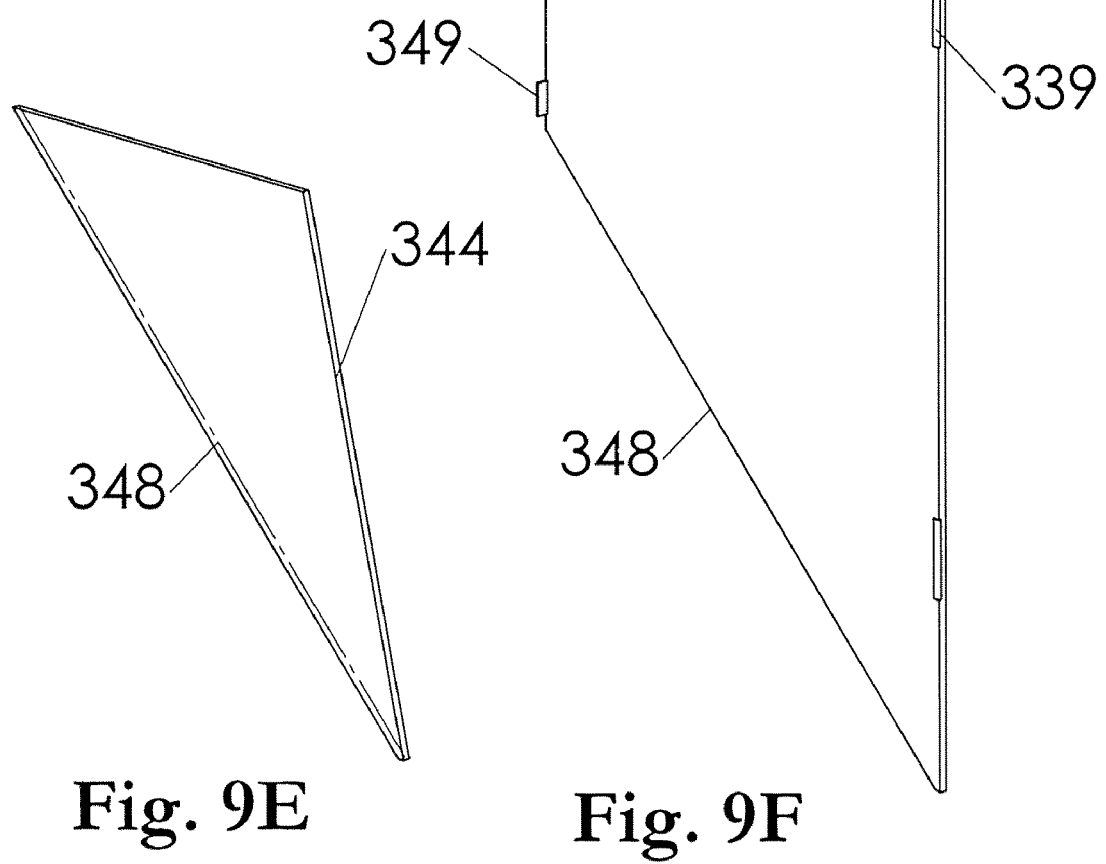
FIG. 9E is the forward-most lower triangular panel.
FIG. 9F is the forward-most side panel.

In certain panels of certain embodiments of the present invention, clearance cuts 339 may be required to avoid interference with the vehicle, hinges, latches, and even other panels. For example, FIG. 9F shows clearance cuts 339 made on a panel 323 to avoid interference with the trailer door hinge.

Figure 3A:
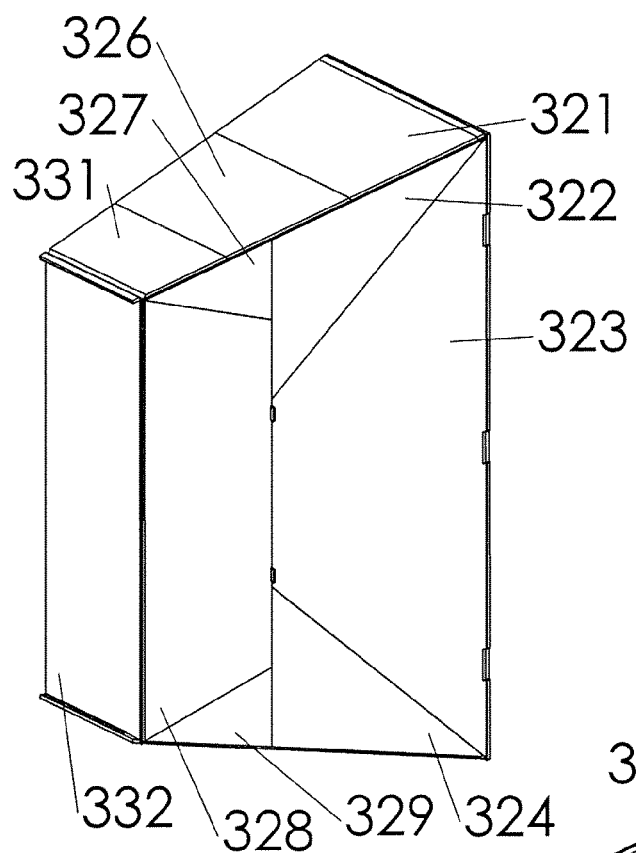
FIGS. 3A through 3D are all perspective views showing one of the two panel groups of FIGS. 2A through 2D in a fully extended configuration. In particular.
Figure 3B:
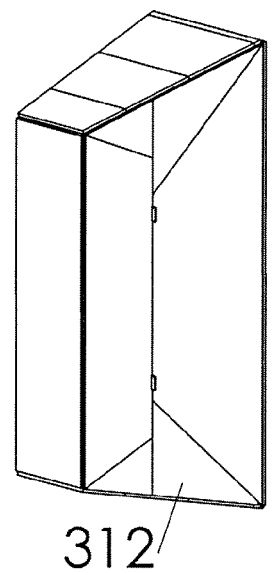
Figure 3C:
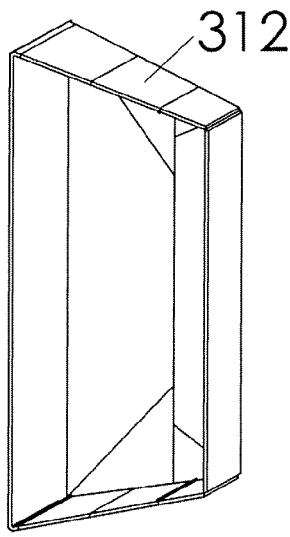
Figure 3D:
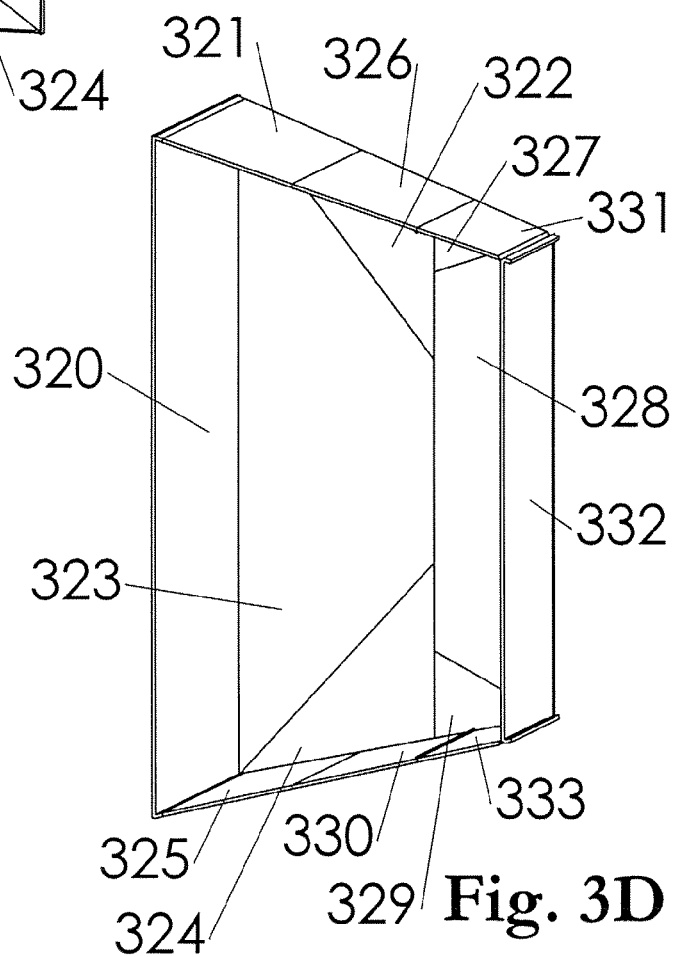
Figure 4A:
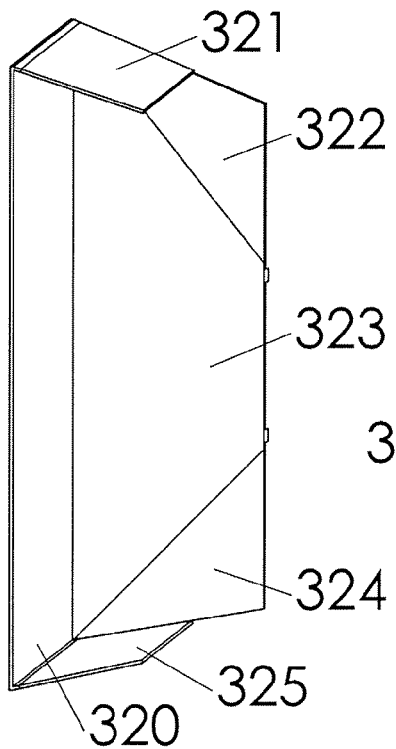
FIGS. 4A through 4F are all perspective views of the same scale, showing several panels of the panel group of FIGS. 3A and 3D. The panels that are not near the large end of the panel group have been removed for the purpose of illustration. In particular.
Figure 4B:
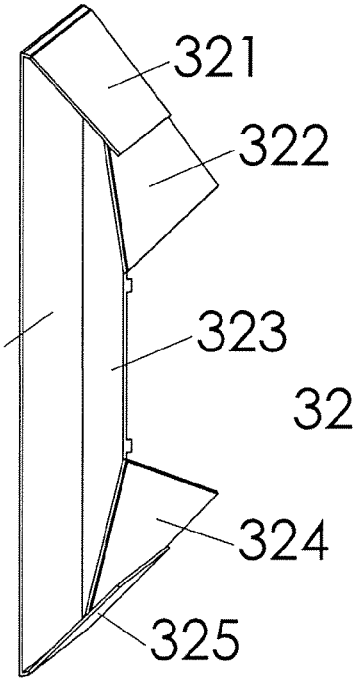
Figure 4C:
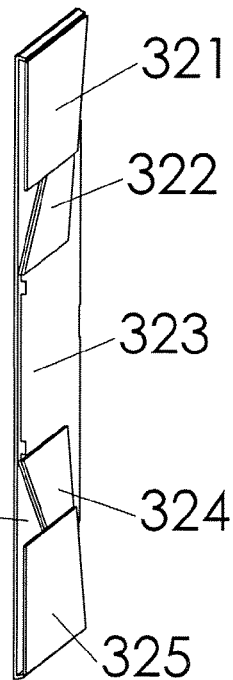
Figure 4D:
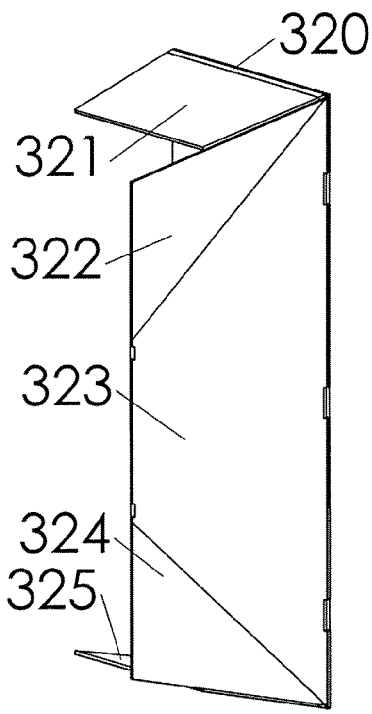
Figure 4E:
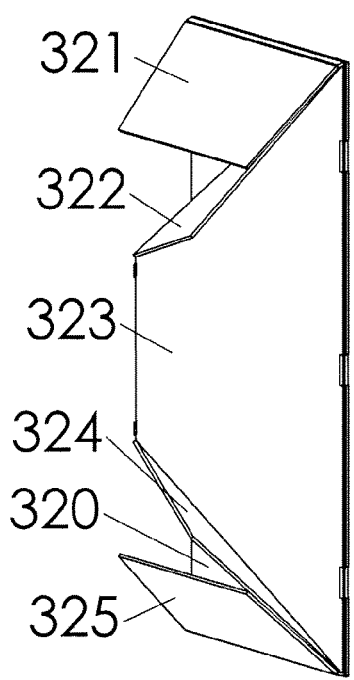
Figure 4F:
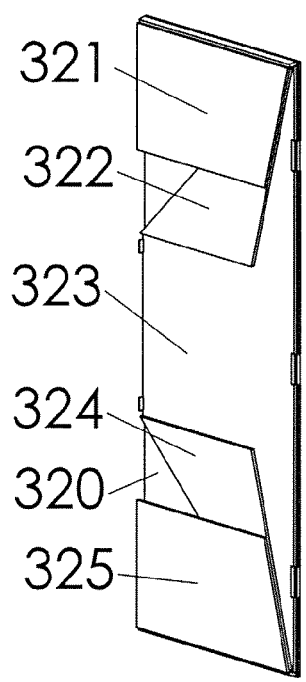
Figure 5A:
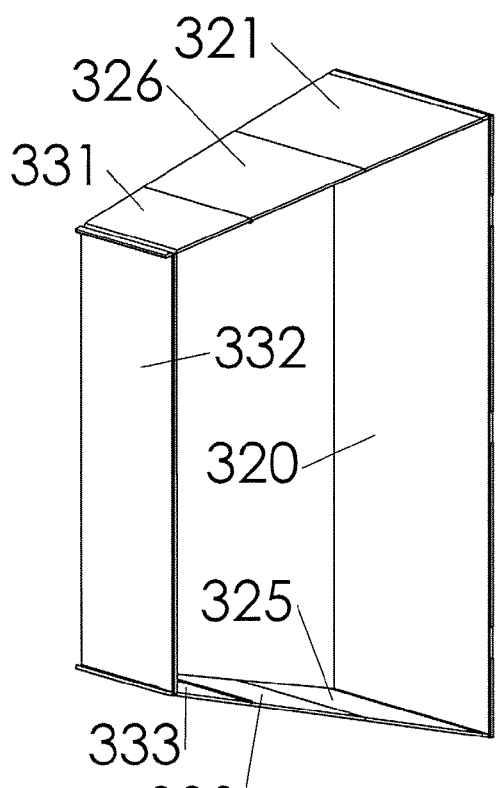
FIGS. 5A through 5D are all perspective views of the same scale as FIGS. 4A through 4F, showing several panels of the panel group of FIGS. 3A and 3D. The side panels have been removed for the purpose of illustration. In particular.
Figure 5B:
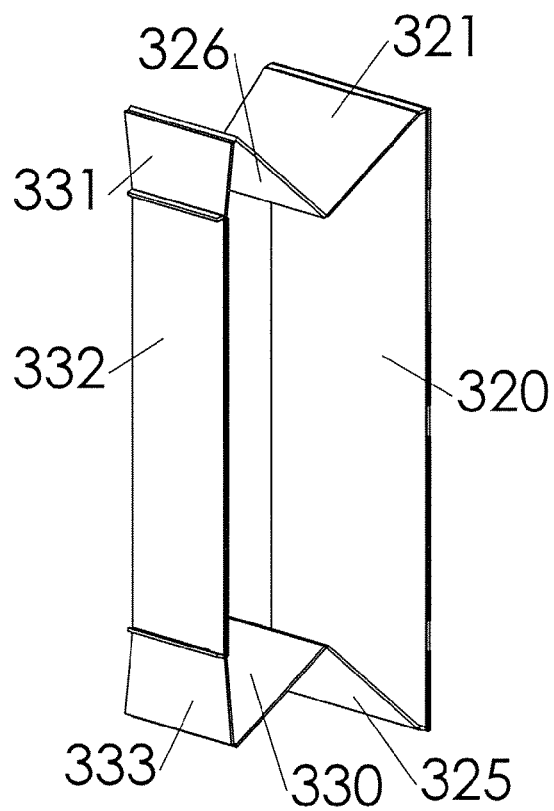
Figure 5C:
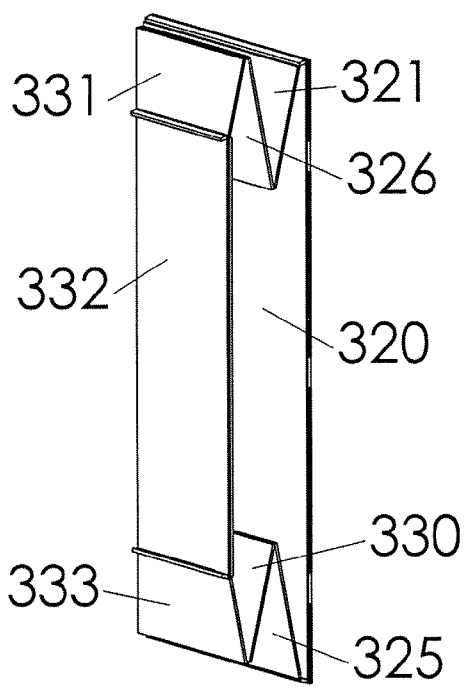
Figure 5D:
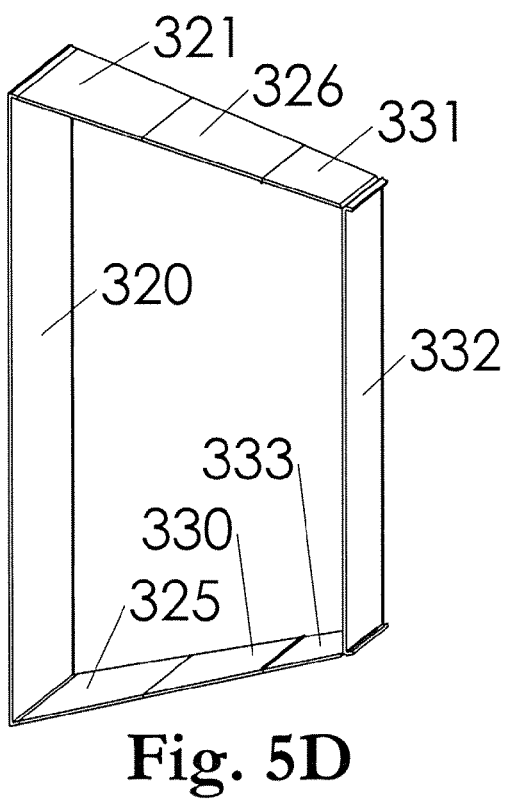
Figure 6A:
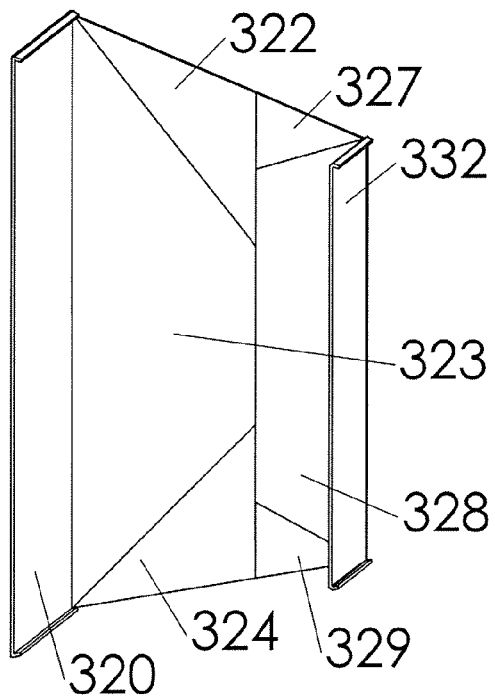
FIGS. 6A through 6D are all perspective views of the same scale as FIGS. 4A through 4F, showing several panels of the panel group of FIGS. 3A and 3D. The top and bottom panels have been removed for the purpose of illustration. In particular.
Figure 6B:
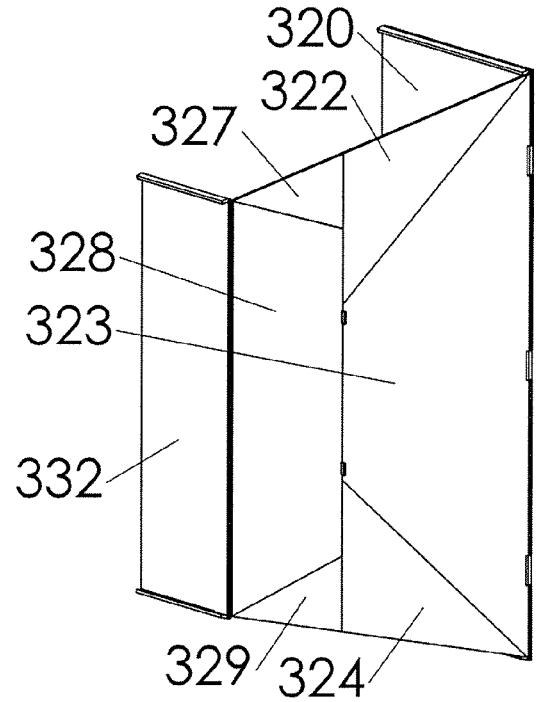
Figure 6C:
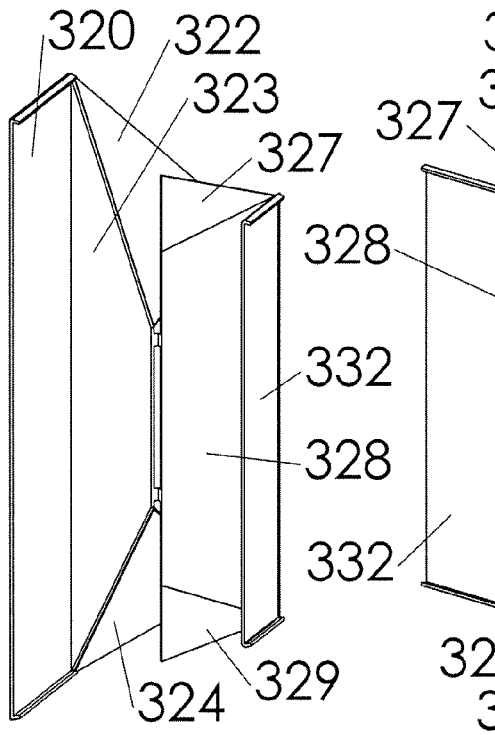
Figures 6D, 7:
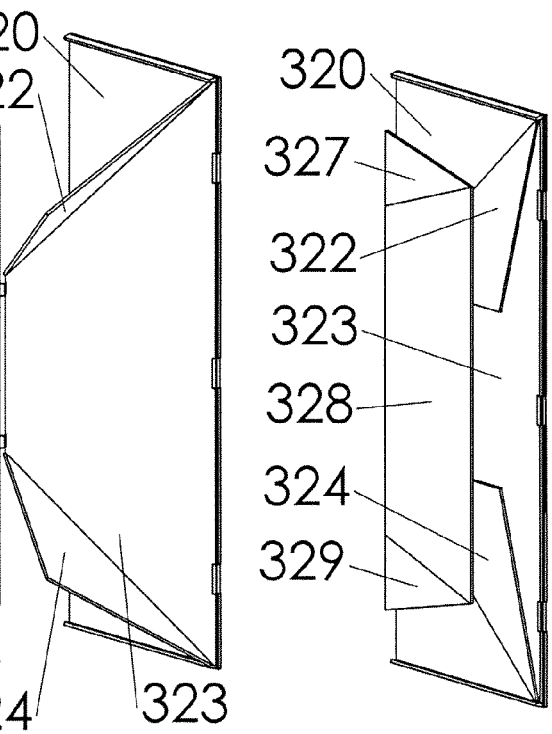
FIG. 7 has the same view perspective and scale as FIGS. 4D through 4F and shows several panels of the panel group of FIGS. 3A and 3D in a fully retracted configuration. The top, bottom, and rear panels have been removed for the purpose of illustration.

FIGS. 2A through 2D and 3A through 3D illustrate that the panels are arranged in panel groups 311 and 312. The panel groups 311 and 312 combine to form the apparatus 303. The panel group farthest upstream 311 attaches to the rear door of the trailer 1 or the rear of the vehicle as appropriate. The following panel group 312 attaches to the rear of the panel group 311 ahead of it. In these illustrations, only two panel groups 311 and 312 are shown. In other embodiments of the present invention, one panel group may be used alone in an apparatus, or more than two panel groups may be assembled in succession within an apparatus. The mating panels between panel groups 311 and 312, specifically the front panel of the reward group and the rear panel of the forward group, may be integrated into a single structure serving the requirements of both groups. FIGS. 2A through 2D show two panel groups 311 and 312 connected to each other, as they would be in operation. FIGS. 3A and 3D show the larger panel group 311 by itself. Likewise, FIGS. 3B and 3C show the smaller panel group 312 by itself.

Figure 9G:
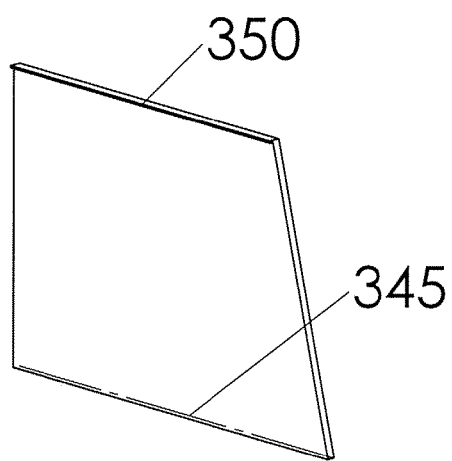
FIG. 9G is the middle top panel.
Figure 9I:
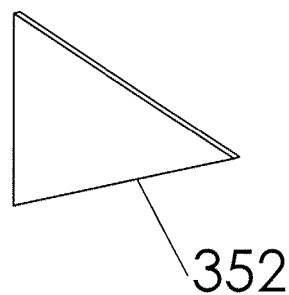
FIG. 9I is the rearmost upper triangular panel.
Figure 9H:
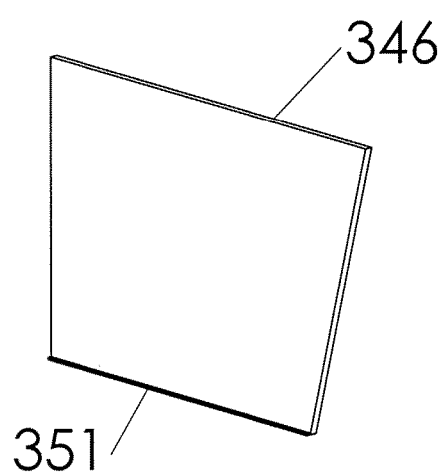
FIG. 9H is the middle bottom panel.
Figure 9J:
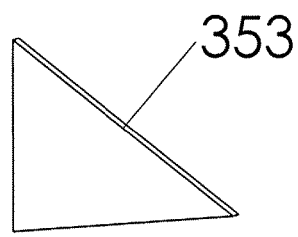
FIG. 9J is the rearmost lower triangular panel.
Figure 9K:
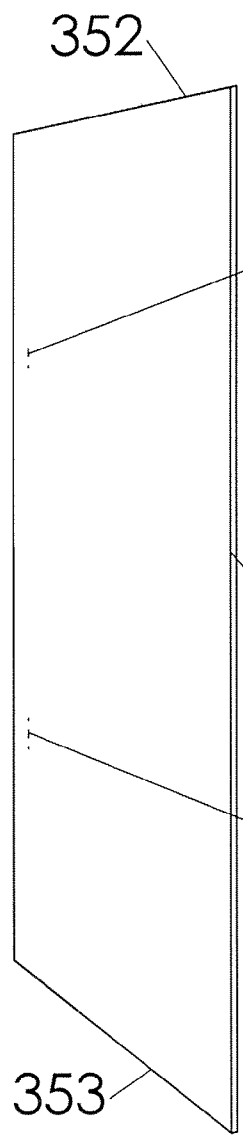
FIG. 9K is the rearmost side panel.
Figure 9L:
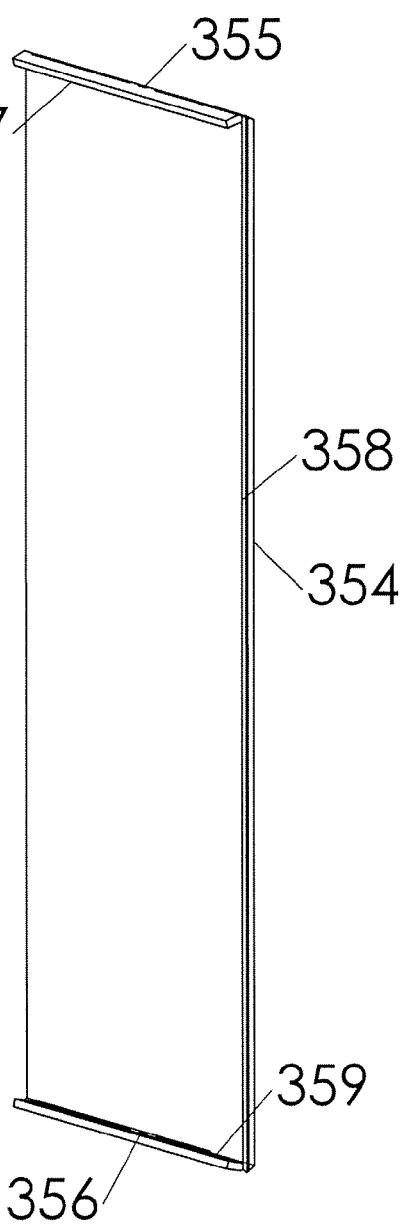
FIG. 9L is the rear panel.
Figure 9M:
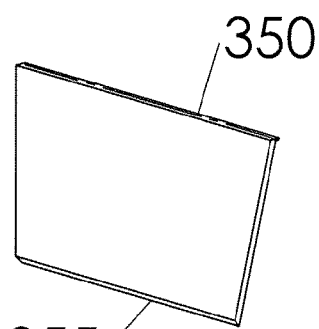
FIG. 9M is the rearmost top panel.
Figure 9N:
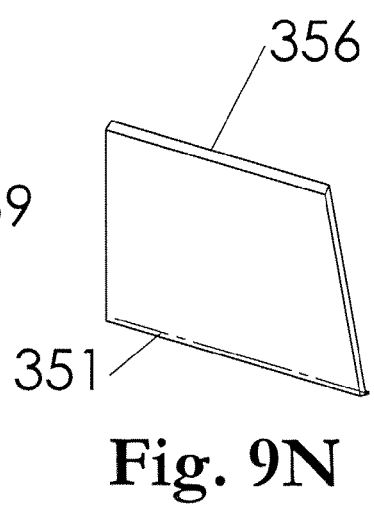

The panel groups 311 and 312 are similar to each other in regards to the function of their corresponding top and side panels 321, 322, 323, 324, 325, 326, 327, 328, 329, 330, 331, and 333. The fold-lines 340, 341, 342, 343, 344, 345, 346, 347, 348, 349, 350, 351, 352, 353, 354, 355, 356, 357, 358, and 359, illustrated in FIGS. 9A through 9N, are also similar in function to their corresponding fold-lines from other panel groups 311 and 312. Furthermore, the front panel 320 is similar in function between the panel groups 311 and 312 in that it connects to or is integrated with what comes immediately in front of it. This could be either the trailer door or the rear panel 332 from the panel group 311 that precedes it. Likewise, the rear panel 332 is similar in function between the panel groups 311 and 312 in that it connects to or is integrated with the front panel 320 of the panel group 312 immediately behind it. In the case of the last panel group 312, the rear panel 332 is an exterior panel of the apparatus 302 and 303. The panels belonging to panel groups 311 farther forward are typically larger than their corresponding panels belonging to more rearward panel groups 312.

FIGS. 4A through 4F, 5A through 5D, 6A through 6D, and 7 illustrate the workings of a panel group 311 of a typical embodiment of the present invention. This is done by removing certain panels of the panel group 311 from each illustration. Even though different panels are hidden from each illustration, the shape and size of all panels, including the hidden panels, along with the location of their respective fold-lines are used to calculate the kinematic position of each panel throughout its range of motion in each illustration. Isolating and studying the relationships between certain sub-groups of panels clarifies the function each individual panel and its respective fold-line(s) has in the panel group 311. These descriptions and figures are based on a specific panel group 311 of a specific embodiment of the present invention for the purposes of illustration only. Other embodiments of the present invention and even other panel groups within the present embodiment will have different proportions than those shown. Panel groups of other embodiments of the present invention will have different relationships between the panels and may have different quantities of panels.

FIGS. 4A through 4F illustrate the relationships between the front panel 320, the forward-most top panel 321, the forward-most upper triangular panel 322, the forward-most side panel 323, the forward-most lower triangular panel 324, and the forward-most bottom panel 325. These panels 320, 321, 322, 323, 324, and 325 are also shown individually with their respective fold-lines in FIGS. 9A through 9F. The panels are connected to each other by fold-lines as follows: Fold-line 340 connects the front panel 320 (FIG. 9A) to the forward-most top panel 321 (FIG. 9B). Likewise, fold-line 342 connects the front panel 320 (FIG. 9A) to the forward-most bottom panel 325 (FIG. 9C). Fold-line 341 connects the front panel 320 (FIG. 9A) to the forward-most side panel 323 (FIG. 9F). Fold-line 347 connects the forward-most side panel 323 (FIG. 9F) to the forward-most upper triangular panel 322 (FIG. 9D). Likewise, fold-line 348 connects the forward-most side panel 323 (FIG. 9F) to the forward-most lower triangular panel 324 (FIG. 9E). Fold-line 343 connects the forward-most top panel 321 (FIG. 9B) to the forward-most upper triangular panel 322 (FIG. 9D). Likewise, fold-line 344 connects the forward-most bottom panel 325 (FIG. 9C) to the forward-most lower triangular panel 324 (FIG. 9E). This arrangement of fold-lines and panels results in a coordinated deployment of the panels from the fully retracted to fully extended configurations and a coordinated stowage of the panels from the fully extended to fully retracted configurations. The configuration of panels 320, 321, 322, 323, 324, and 325 within this sub-group is determined by a single variable. Thus, by controlling the angle across any fold-line 340, 341, 342, 343, 344, 347, or 348, the angles across the remaining fold-lines are determined and the configuration of the panels 320, 321, 322, 323, 324, and 325 is known.

FIGS. 5A through 5D illustrate the relationships between the front panel 320, the forward-most top panel 321, the forward-most bottom panel 325, the middle top panel 326, the middle bottom panel 330, the rearmost top panel 331, the rear panel 332, and the rearmost bottom panel 333. These panels 320, 321, 325, 326, 330, 331, 332, and 333 are also shown individually with their respective fold-lines in FIGS. 9A through 9C, 9G, 9H, and 9L through 9N. The panels are connected to each other by fold-lines as follows: Fold-line 340 connects the front panel 320 (FIG. 9A) to the forward-most top panel 321 (FIG. 9B). Likewise, fold-line 342 connects the front panel 320 (FIG. 9A) to the forward-most bottom panel 325 (FIG. 9C). Fold-line 345 connects the forward-most top panel 321 (FIG. 9B) to the middle top panel 326 (FIG. 9G). Likewise, fold-line 346 connects the forward-most bottom panel 325 (FIG. 9C) to the middle bottom panel 330 (FIG. 9H). Fold-line 350 connects the middle top panel 326 (FIG. 9G) to the rearmost top panel 331 (FIG. 9M). Likewise, fold-line 351 connects the middle bottom panel 330 (FIG. 9H) to the rearmost bottom panel 333 (FIG. 9N). Fold-line 355 connects the rearmost top panel 331 (FIG. 9M) to the rear panel 332 (FIG. 9L). Likewise, fold-line 356 connects the rearmost bottom panel 333 (FIG. 9N) to the rear panel 332 (FIG. 9L). Unlike the preceding sub-group, this sub-group of panels 320, 321, 325, 326, 330, 331, 332, and 333 by themselves does not form a configuration that can be determined by a single variable. It relies on the panel group as a whole to determine its configuration.

FIGS. 6A through 6D illustrate the relationships between the front panel 320, the forward-most upper triangular panel 322, the forward-most side panel 323, the forward-most lower triangular panel 324, the rearmost upper triangular panel 327, the rearmost side panel 328, the rearmost lower triangular panel 329, and the rear panel 332. These panels 320, 322, 323, 324, 327, 328, 329, and 332 are also shown individually with their respective fold-lines in FIGS. 9A, 9D through 9F, and 9I through 9L. The panels are connected to each other by fold-lines as follows: Fold-line 341 connects the front panel 320 (FIG. 9A) to the forward-most side panel 323 (FIG. 9F). Fold-line 347 connects the forward-most side panel 323 (FIG. 9F) to the forward-most upper triangular panel 322 (FIG. 9D). Likewise, fold-line 348 connects the forward-most side panel 323 (FIG. 9F) to the forward-most lower triangular panel 324 (FIG. 9E). Fold-line 349 connects forward-most side panel 323 (FIG. 9F) to the rearmost side panel 328 (FIG. 9K). Fold-line 352 connects the rearmost side panel 328 (FIG. 9K) to the rearmost upper triangular panel 327 (FIG. 9I). Likewise, fold-line 353 connects the rearmost side panel 328 (FIG. 9K) to the rearmost lower triangular panel 329 (FIG. 9J). Fold-line 354 connects the rearmost side panel 328 (FIG. 9K) to the rear panel 332 (FIG. 9L). As with the preceding sub-group, this sub-group of panels 320, 322, 323, 324, 327, 328, 329, and 332 by themselves does not form a configuration that can be determined by a single variable. It relies on the panel group as a whole to determine its configuration. The rearmost upper and lower triangular panels 327 and 329 must fold to prevent interference between themselves and the rearmost top and bottom panels 331 and 333 respectively. This folding is needed during a portion of the extension-retraction process and can be most clearly observed in FIGS. 2C and 2D. The orientation of the rearmost upper and lower triangular panels 327 and 329 is determined by their contact with the rearmost top and bottom panels 331 and 333 respectively or by a joint-stop keeping them parallel with the rearmost side panel 328. The related fold-lines 352 and 353 are spring-loaded, keeping the panels 327 and 329 against their respective stops until contact is made with the rearmost top and bottom panels 331 and 333 respectively.

In the case that the front panel 320 of a rearward panel group 312 and the rear panel 332 of the preceding panel group 311 are integrated, additional fold-lines will be found on the combined panel 320/332 to serve their corresponding purpose for both panel groups 311 and 312. This is illustrated in FIG. 9L where fold-lines 357, 358, and 359 are present. These fold-lines serve the same purpose as fold-lines 340, 341, and 342 as shown in FIG. 9A, but for the following panel group 312.

The panel group 311 with all panels present forms an assembly whose configuration is determined by a single variable. This is of great benefit whether the apparatuses 302 and 303 are deployed manually or by automated means, as each panel group can be managed with a single variable rather than as multiple individual panels. Furthermore, it is possible to coordinate panel groups with each other so that the configuration of the entire apparatus or pair of apparatuses can be managed by a single variable.

Figure 10A:
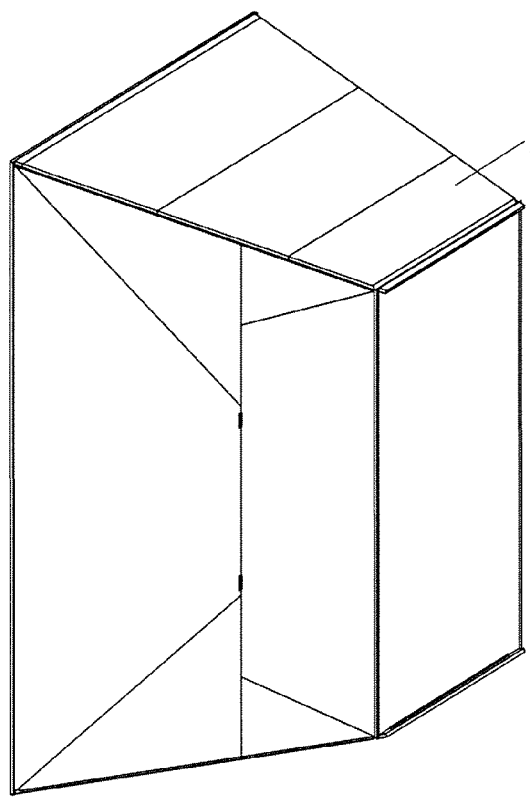
FIGS. 10A through 10C are all perspective views sharing the same scale and perspective from the left rear corner, showing a panel group from a second embodiment of the present invention in various configurations. In this embodiment, the aerodynamic drag reducing apparatus is not split in two halves, but is fanned of panel groups that span the vehicle. In particular.
Figure 10B:
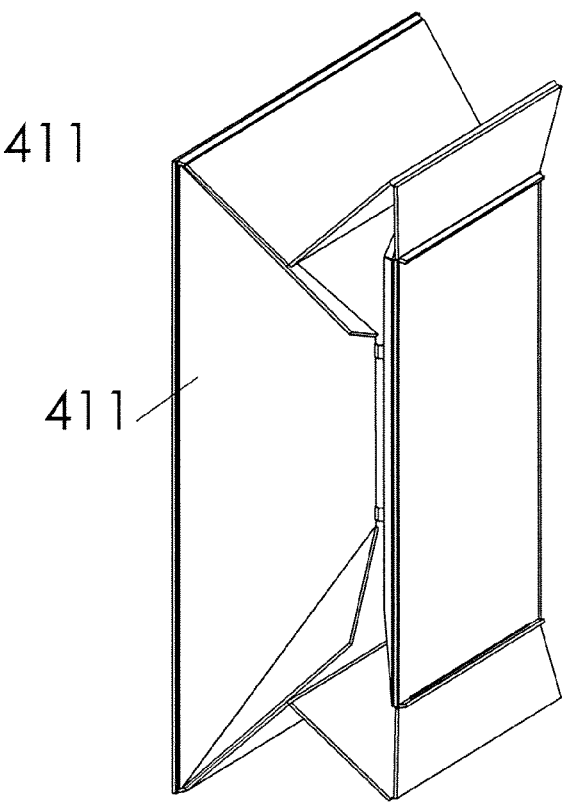
Figure 10C:
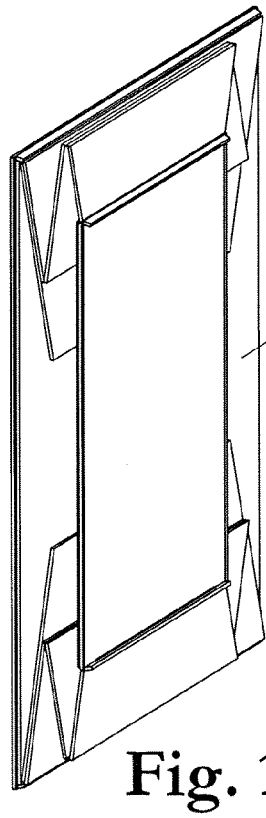
Figure 11:
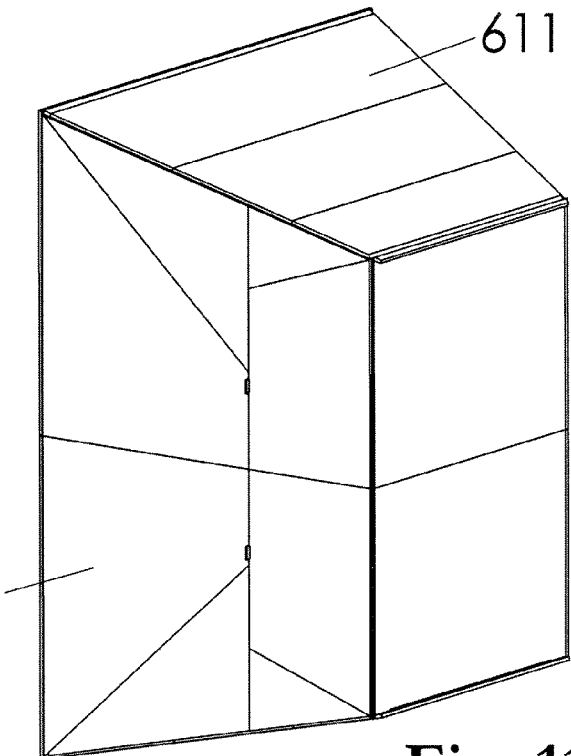
FIG. 11 is a perspective view from the left rear corner, showing a pair of panel groups from a third embodiment of the present invention in a fully extended configuration. In this embodiment, the aerodynamic drag reducing apparatus is split in two halves, one upper and the other lower.
Figure 12A:
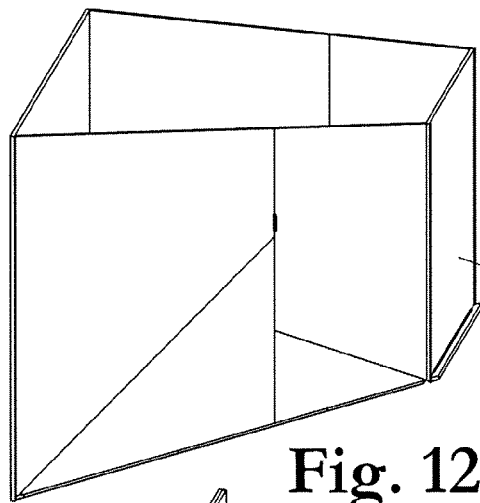
FIGS. 12A through 12C are all perspective views sharing the same scale and perspective from the left rear corner, showing the lower panel group of FIG. 11. In particular.
Figure 12B:
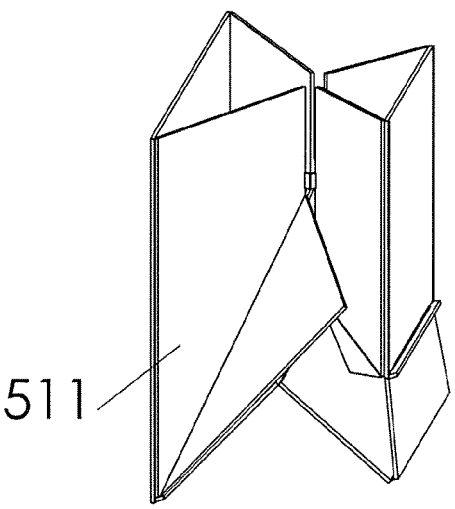
Figure 12C:
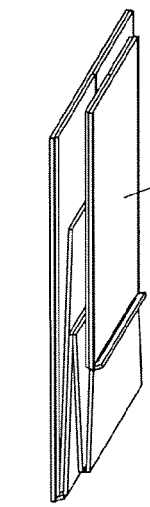

The discussions above focus primarily on an embodiment of the present invention suited for vehicles with rear doors having vertical hinge-lines served by two apparatuses 302 and 303. Vehicles and trailers with neither rear doors nor need for access to the rear of the vehicle are better served by a second embodiment of the present invention that spans the width of the vehicle. This embodiment is formed by combining the two apparatuses 302 and 303, at their common edges, into a single apparatus, as illustrated by the panel group 411 in FIGS. 10A through 10C. More specifically, the right hand and left hand versions of the panel group 311 are combined by joining the common edges of the front, rear, top, and bottom panels 320, 321, 325, 326, 330, 331, 332, and 333. As in the previous embodiment, multiple panel groups can be arranged one behind the other to form an extended apparatus. As in the preceding panel groups 311 and 312, the configuration of the combined panel group 411 is also controlled by a single variable.

The embodiment of the preceding paragraph may be adapted for use with vehicles having rear doors by mounting the combined apparatus on a support panel, door, or framework that in turn is mounted on a hinge, linkage, or linear slide. The whole apparatus can thus be temporarily moved when access to the rear of the vehicle is required.

Figure 13A:
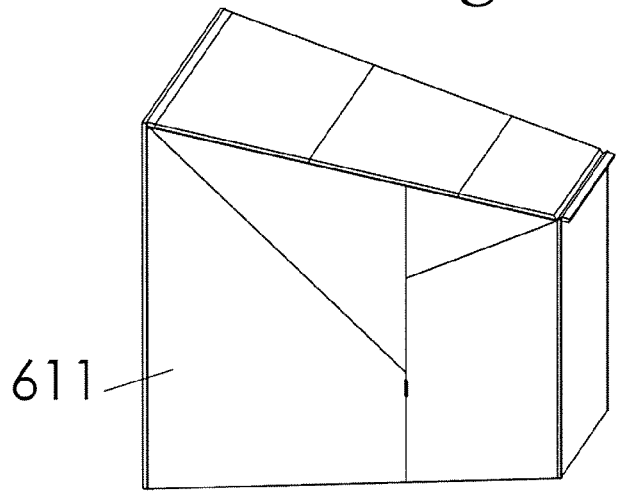
FIGS. 13A through 13C are all perspective views sharing the same scale and perspective as FIGS. 12A through 12C, showing the upper panel group of FIG. 11. In particular.
Figure 13B:
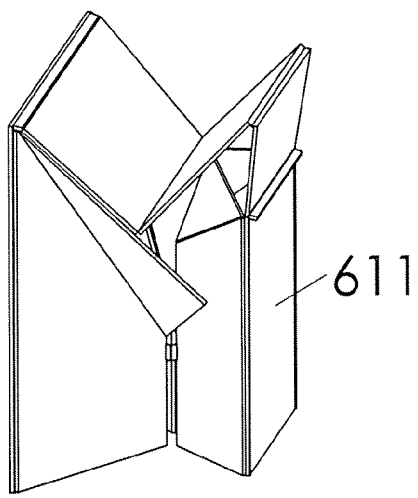
Figure 13C:
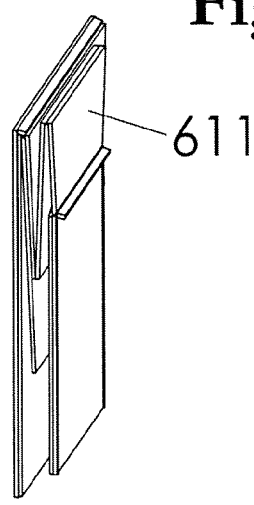

A third embodiment of the present invention is arrived at by splitting the apparatus in the preceding paragraph, exemplified by panel group 411, about a horizontal plane near its center, creating two halves: one upper apparatus and one lower apparatus. This embodiment is illustrated by the panel groups 511 and 611 shown in FIGS. 11, 12A through 12C, and 13A through 13C. This configuration is suited for use on vehicle doors with horizontal hinges. This embodiment could also be rotated ninety degrees and used on vehicles whose doors have vertical hinges. As in the previous embodiments, panel groups in successively smaller sizes can be connected one behind the other to extend the gently sloping surfaces and reduce the rear-facing area in the fully extended configuration. This embodiment retains the desirable characteristics of stability and configuration by a single variable. Panel groups of this embodiment can be used individually. For example, the panel group 611 in FIGS. 13A through 13C could be used behind the cab of a pickup truck.

A fourth embodiment of the present invention is comprised of panels and/or framed panels 721, 722, 724, 726, and 731 combined to form a panel group 711 as illustrated in FIGS. 14A through 14D, 15A and 15B. Coverings 750, 751, and 752 (not shown in FIGS. 14A through 14D) are formed of flexible material and attached to certain areas of certain panels 721, 722, 724, 726, and 731. Certain coverings 750 and 752 may attach to and/or cover two or more panels or framed panels 721, 722, 724, 726, and 731. Certain forms of the current embodiment have a single covering substantially forming the exterior surface of the apparatus. Certain panels and framed panels may not attach to the covering but serve to provide a shape and structural support for it. Certain panels, such as counterparts to panels 327 and 329 (illustrated in FIGS. 3A and 3D), are not required by this embodiment. Other panels 722 and 724 (counterparts to panels 322 and 324 also illustrated in FIGS. 3A and 3D) may take a shape that does not fully fill the apparatus' exterior when it is fully extended but still provide the required structural and kinematic support. In these cases, the exterior shape of the extended apparatus in these areas is determined by the panels and/or framed panels adjoining the removed or reduced panels. A covering spans any void created by the removed or reduced panels in the extended configuration and attaches to other panels of the apparatus. The present embodiment may be adapted to and combined with the other embodiments of the present invention.

A fifth embodiment of the present invention can be arrived at by splitting the third embodiment about a vertical plane near its center as illustrated by FIGS. 17 and 18A through 18D. This embodiment retains the desirable characteristics of stability and configuration by a single variable. In contrast to certain embodiments above which combine a pair of apparatuses to cover the rear surface of a vehicle, this embodiment requires four apparatuses 512, 513, 612, and 613 arranged in quarters. In the example of the pickup truck, only the upper two quarters 612 and 613 would be required. Just as in the embodiments above, multiple panel groups can be arranged one behind the other. This embodiment may be combined with the embodiment of the preceding paragraph. In this case, panel 629 is not required. The hole in the extended configuration created by the removal of panel 629 is spanned by the covering. The shape of the covering over this hole when the apparatus is in the extended configuration is determined by panel edges adjacent to the hole.

FIGS. 16A through 16E further illustrate the fabric joint type. More specifically, and first panel or framed panel 810 is joined fabric 820 which in turn is also joined to a second panel 830. Unlike a common hinge, this joint type does not have a precisely defined hinge-line. Nonetheless, a folding action is made possible with sufficient precision for the present invention.

Optional joint-stops 840 and bias springs 850, as illustrated in FIGS. 16B through 16E, maybe added to certain joints of any of the various joint types.

In all of the embodiments discussed above, the beneficial features of the present invention are the gently sloping exterior surfaces when extended, the compact space it occupies when retracted, the relative simplicity of the design, the simple and low cost components of which it consists, the innate ability to control all panels within a panel group with one variable, and the ability to control all the panels within an apparatus or pair of apparatuses with one variable.

In the present disclosure, the words "a" or "an" are to be taken to include both the singular and the plural. Conversely, any references to plural items shall, where appropriate, include the singular.

It is desirable for drag reducing devices in accordance with the principles of the present disclosure to be shaped to reduce the effects of air flow separation. In certain example embodiments, drag reducing devices in accordance with the principles of the present disclosure may define angles $\alpha, \beta$, and $\gamma$ (see FIGS. 1G and 1J) relative to the rear surface of the vehicle that is less than 18 degrees, or in the range of 10 to 18 degrees.

Figure 1F:
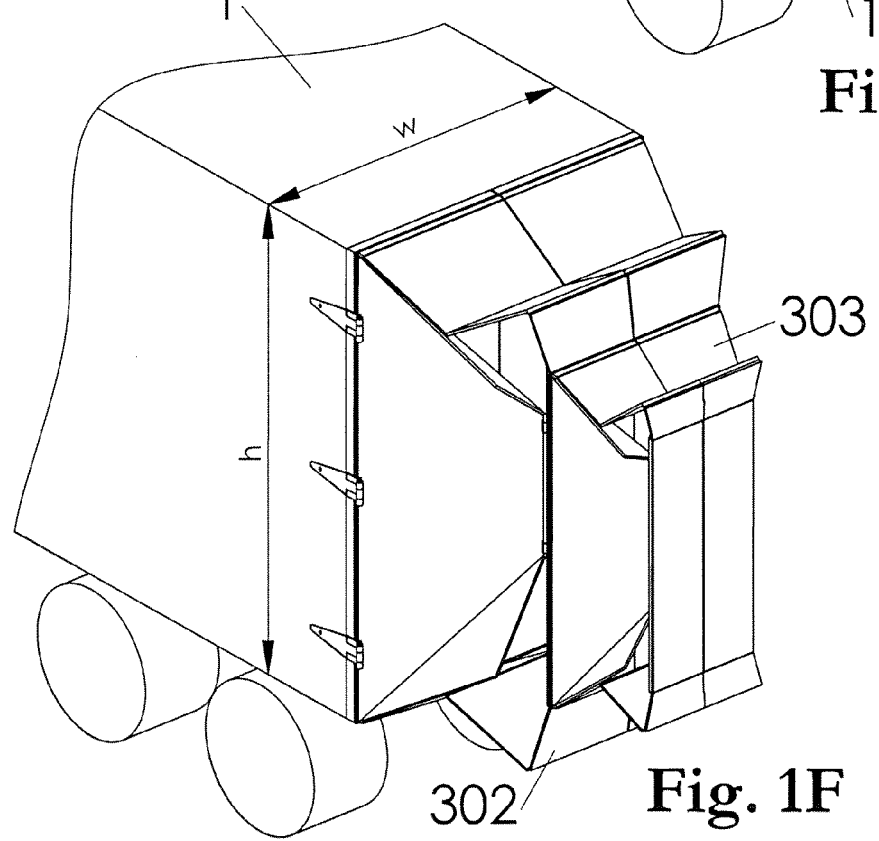
Figure 1G:
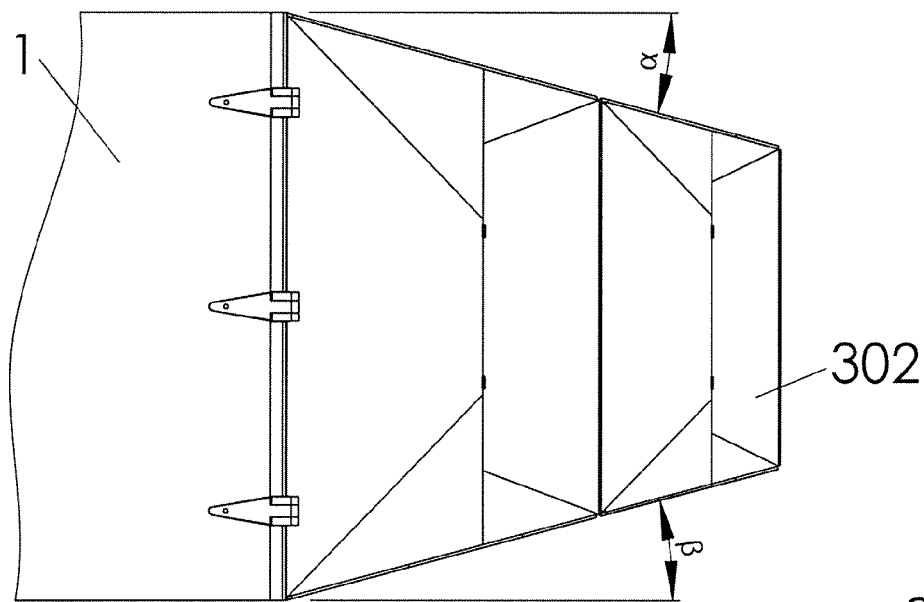
Figure 1H:
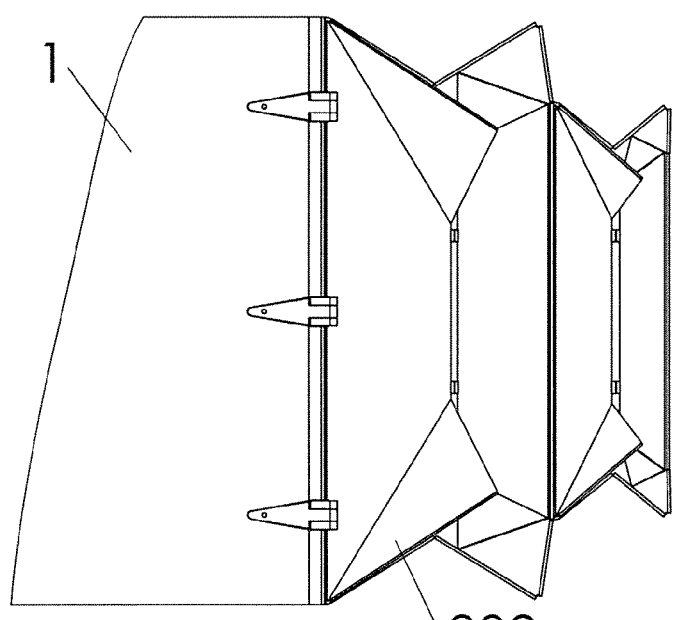
Figure 1I:
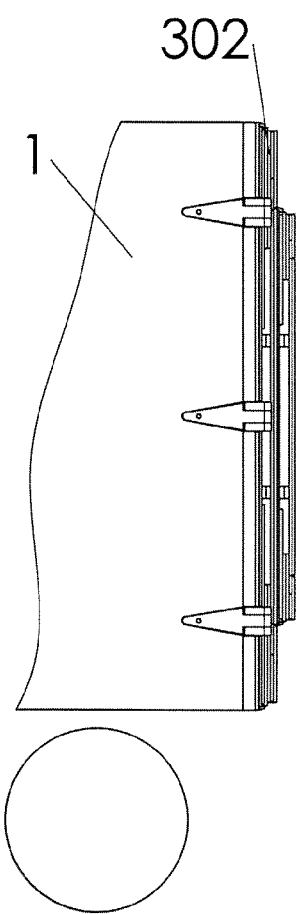
Figure 1J:
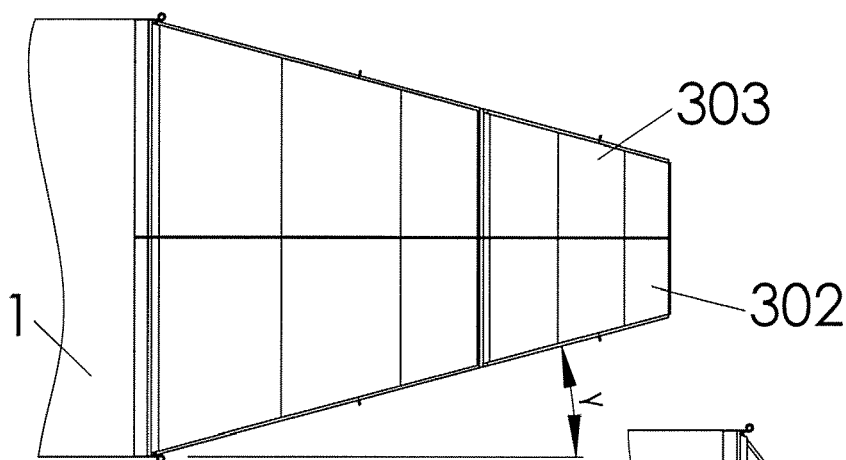
Figure 1K:
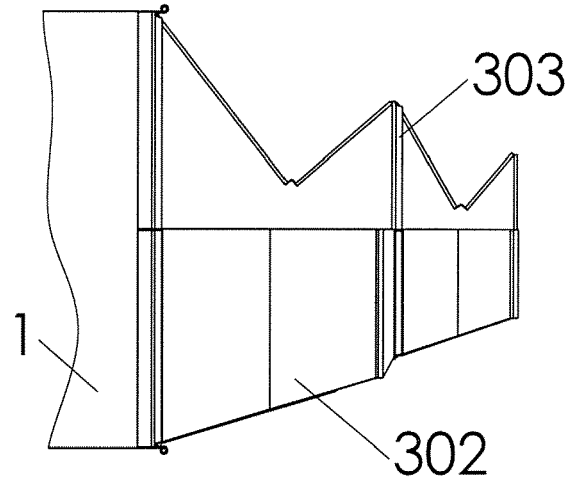
Figure 1L:
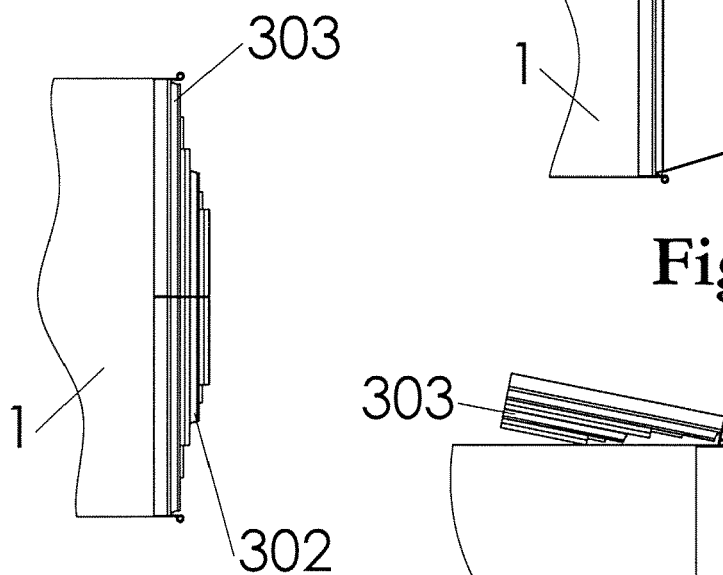
Figure 1M:
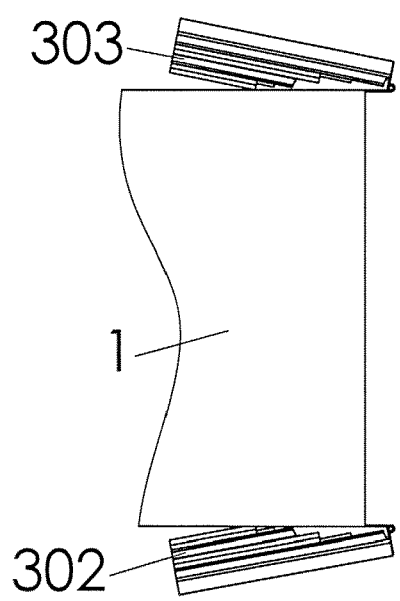
Figure 2A:
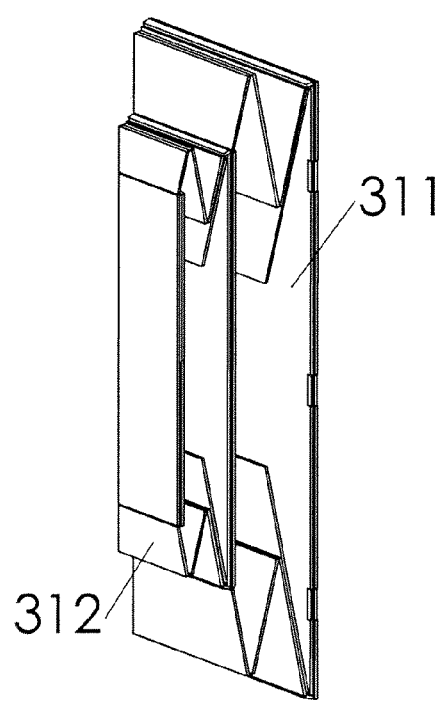
FIGS. 2A through 2D are all perspective views showing the right apparatus of FIGS. 1A through 1M by itself in various configurations. In this embodiment of the present invention, two panel groups are shown. The larger group is attached to the right door of the trailer on its large end, and the smaller group is attached to the panel of the larger group that is farthest from the trailer door. In particular.
Figure 2B:
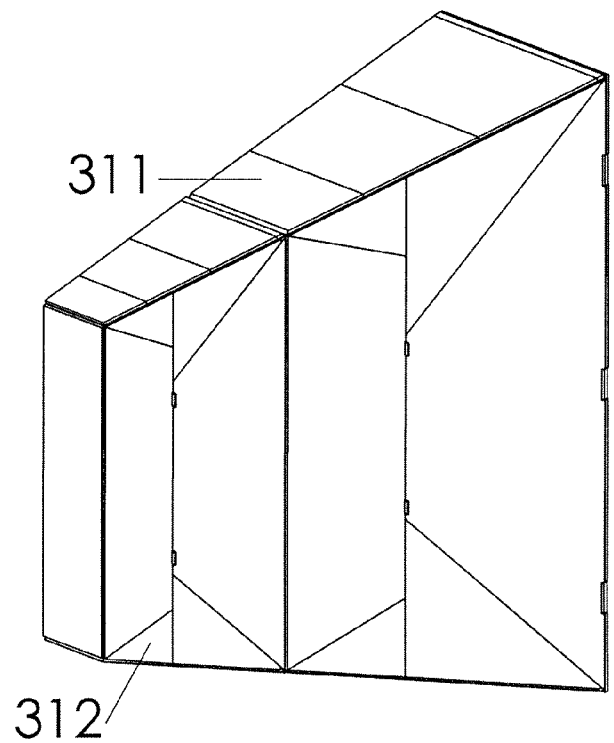
Figure 2C:
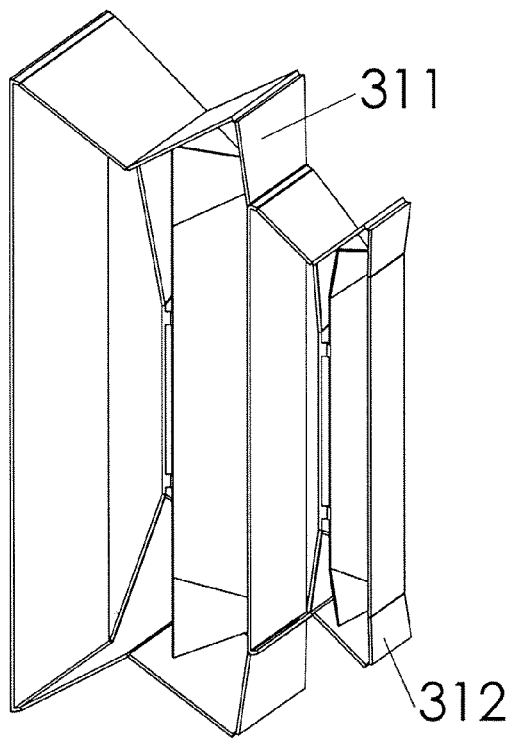
Figure 2D:
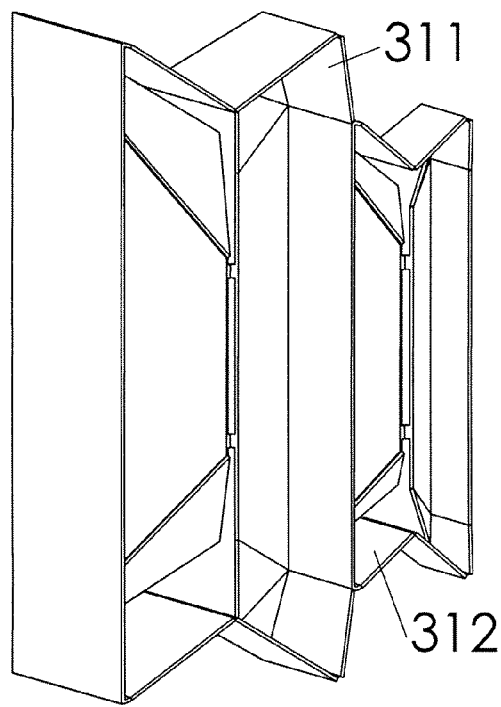

When extended, drag reducing devices in accordance with the present disclosure are typically truncated (see FIG. 1A). In certain truncated embodiments, the extended lengths of the drag reducing devices are such that the effects of drag caused by air flow separation at the truncated ends are minimal. In example embodiments suitable for tractor trailers, the drag reducing devices may have extended lengths greater than 4 feet, or in the range of 6 to 22 feet, or in the range of 8-14 feet. Vehicles having smaller heights and widths could be equipped with proportionally smaller drag reduction devices. In certain embodiments, the ratio of the extended length of the drag reduction device to a reference dimension of the vehicle is at least 1 to 1. The reference dimension is typically the smaller of the width or the height of the rear of the vehicle body. In the embodiment of FIG. 1F, the width w is the reference dimension since it is smaller than the height h. In other embodiments, this ratio is at least 1.5 to 1, or at least 2 to 1, or at least 3 to 1.

In certain embodiments, drag reducing devices in accordance with the present disclosure may be automatically extended or retracted. A control system may be used to automatically control extension and retraction. In certain embodiments, vehicle speed, crosswind speed, or other vehicle parameters may be used to automatically control retraction extension. For example, a controller may sense vehicle speed, and automatically cause retraction of the drag reducing device if the vehicle speed moves below a given speed value (e.g., 45 miles per hour). In another example, a controller may sense crosswind speed, and automatically cause retraction if crosswinds exceed a given value (e.g., 25 miles per hour).

Retractable drag reducing devices in accordance with the present disclosure can have relatively long extended lengths as compared to retracted lengths. Certain embodiments have an extended length to retracted length ratio of at least 6 to 1. Other embodiments have extended length to retracted length ratios of at least 10 to 1 or at least 20 to 1.

While specific angles and lengths have been specified for certain embodiments of the present disclosure, it will be appreciated that the broad aspects of the present disclosure are not limited to these values.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A drag reducing device for use in reducing drag on vehicles, the drag reducing device comprising:
   a drag reducing assembly that is movable between an extended configuration and a retracted configuration, the drag reducing assembly including a first end adapted for connection to the vehicle and a second end that is moved outwardly from the first end when the drag reducing assembly is moved from the retracted configuration toward the extended configuration;
   the drag reducing assembly at least partially defining an extended volume when the drag reducing assembly is in the extended configuration, the extended volume tapering inwardly as the drag reducing assembly extends in a direction from the first end to the second end of the drag reducing assembly;
   the drag reducing assembly including at least a first panel group that at least partially encloses at least a first portion of the extended volume when the drag reducing assembly is in the extended configuration, the first panel group defining at least a first side and a second side, the first panel group including a plurality of panels that are movable relative to one another about fold-lines that are relatively positioned to define a fold-line arrangement, the fold-line arrangement being configured to enable the panels of the first panel group to be folded and unfolded in a coordinated manner such that the first panel group can be extended and retracted as a unit; and
   the plurality of panels of the first panel group including at least three panels forming the first side and at least three panels forming the second side.

2. The drag reducing device of claim 1, wherein the first side includes a top side and the second side includes a right side or a left side.

3. The drag reducing device of claim 2, wherein the plurality of panels of the first panel group includes at least three panels forming a bottom side.

4. The drag reducing device of claim 3, further comprising an end support member positioned at the second end of the drag reducing assembly for maintaining a spatial relationship between the top side, the bottom side and the right or left side of the drag reducing assembly.

5. The drag reducing device of claim 4, wherein the end support member includes a panel that encloses the second end of the drag reducing assembly.

6. The drag reducing device of claim 3, wherein the panels of the top side are movable relative to one another about top fold-lines that are parallel to one another, wherein the panels of the bottom side are movable relative to one another about bottom fold-lines that are parallel to the top fold-lines, and wherein the panels of the right or left side are movable about certain right or left side fold-lines that are not parallel to one another.

7. The drag reducing device of claim 1, wherein the first side includes more panels than the second side.

8. The drag reducing device of claim 1, wherein the panels of the first panel group are generally parallel to one another when the drag reducing assembly is in the retracted configuration.

9. The drag reducing device of claim 1, wherein the first panel group includes a front end and a rear end, wherein the front end of the first panel group corresponds to the first end of the drag reducing assembly, and wherein the drag reducing assembly also includes a second panel group, the second panel group being connected to the rear end of the first panel group, the second panel group at least partially enclosing a second portion of the extended volume when the drag reducing assembly is in the extended configuration, the second panel group including a plurality of panels movable relative to one another about fold-lines arranged in a fold-line arrangement, the fold-line arrangement being configured to enable the panels of the second panel group to be folded and unfolded in a coordinated manner.

10. The drag reducing device of claim 9, wherein the first portion of the extended volume is larger than the second portion of the extended volume.

11. The drag reducing device of claim 1, wherein the panels of the first panel group include framed panels having frame members that support a flexible covering material.

12. The drag reducing device of claim 11, wherein the frame members are positioned inside the flexible covering material.

13. The drag reducing device of claim 11, wherein the flexible covering material includes a fabric material.

14. The drag reducing device of claim 1, further comprising a second panel group that is generally symmetrical with respect to the first panel group.

15. The drag reducing device of claim 14, wherein the drag reducing assembly defines a split between the first and second panel groups, wherein the first panel group is adapted for connection to a first trailer door, wherein the second panel group is adapted for connection to a second trailer door, and wherein the split allows the first and second trailer doors to be opened without removing the drag reducing device from the first and second trailer doors.

16. The drag reducing device of claim 1, further comprising a second panel group, a third panel group and a fourth panel group, the first, second, third and fourth panel groups cooperating to at least partially define four quadrants of the drag reducing assembly.

17. The drag reducing device of claim 1, further comprising springs for biasing the drag reducing assembly toward the retracted configuration.

18. The drag reducing device of claim 1, wherein the first side and the second side are generally planar when the drag reducing assembly is in the extended configuration.

19. The drag reducing device of claim 18, wherein the first and second sides are oriented at angles in the range of 10-18 degrees relative to a central axis of the drag reducing assembly, the central axis of the drag reducing assembly extending in a direction from the first end of the drag reducing assembly to the second end of the drag reducing assembly.

20. The drag reducing device of claim 1, wherein the first side includes a top side and the second side includes a right side, and wherein the plurality of panels of the first panel group includes at least three panels forming a bottom side and at least three panels forming a left side.

21. A drag reducing device for use in reducing drag on vehicles, the drag reducing device comprising:
    a drag reducing assembly that is movable between an extended configuration and a retracted configuration, the drag reducing assembly including a first end adapted for connection to the vehicle and a second end that is moved outwardly from the first end when the drag reducing assembly is moved from the retracted configuration toward the extended configuration;
    the drag reducing assembly at least partially defining an extended volume when the drag reducing assembly is in the extended configuration, the extended volume tapering inwardly as the drag reducing assembly extends in a direction from the first end to the second end of the drag reducing assembly;
    the drag reducing assembly including a plurality of frames that are movable relative to one another about fold-lines relatively positioned to define a fold-line arrangement that allows the drag reducing assembly to be folded to the retracted configuration and unfolded to the extended configuration; and
    a flexible covering that is supported by the frames at least when the drag reducing assembly is in the extended configuration.

* * * * *